United States Patent
Nista et al.

(10) Patent No.: US 11,900,736 B2
(45) Date of Patent: Feb. 13, 2024

(54) ELECTRONIC LOGGING DEVICE (ELD) APPARATUS, SYSTEM, AND METHOD

(71) Applicant: Stoneridge, Inc., Novi, MI (US)

(72) Inventors: Fabio B. Nista, Sao Paulo (BR);
Anderson Fernandes, Sao Paulo (BR);
Stuart Adams, Perthshire (GB);
Leandro Martins Salado, Sao Paulo (BR)

(73) Assignee: Stoneridge, Inc., Novi, MI (US)

( * ) Notice: Subject to any disclaimer, the term of this patent is extended or adjusted under 35 U.S.C. 154(b) by 0 days.

(21) Appl. No.: 17/650,973

(22) Filed: Feb. 14, 2022

(65) Prior Publication Data

US 2022/0172523 A1 Jun. 2, 2022

Related U.S. Application Data

(63) Continuation of application No. 16/334,001, filed as application No. PCT/US2017/051853 on Sep. 15, 2017, now abandoned.
(Continued)

(51) Int. Cl.
*G07C 5/00* (2006.01)
*B60R 16/023* (2006.01)
(Continued)

(52) U.S. Cl.
CPC .......... *G07C 5/008* (2013.01); *B60R 16/0234* (2013.01); *G06K 7/10386* (2013.01);
(Continued)

(58) Field of Classification Search
CPC ......... G06K 7/10386; G06K 19/07745; G06K 19/07747; G06K 19/07749; G07C 5/00;
(Continued)

(56) References Cited

U.S. PATENT DOCUMENTS

| | | | | |
|---|---|---|---|---|
| 2008/0015015 A1* | 1/2008 | Walker | .................... | A63F 13/98 463/43 |
| 2011/0081860 A1* | 4/2011 | Brown | .................... | G06F 21/35 455/41.3 |

(Continued)

OTHER PUBLICATIONS

Chi Shing Lee, Bluetooth Security Protocol Analysis and Improvements, May 2006, San Jose State University, http://www.cs.sjsu.edu/faculty/stamp/students/cs298ReportSteven.pdf (Year: 2006).*

*Primary Examiner* — Russell Frejd
*Assistant Examiner* — Sara J Lewandroski
(74) *Attorney, Agent, or Firm* — Grossman, Tucker, Perreault & Pfleger, PLLC

(57) ABSTRACT

A mobile device for use in an electronic logging device (ELD) system may include a processor and one or more memories which store, singularly or in combination, one or more instructions, which when executed by the processor cause the mobile device to carry out one or more operations. The one or more operations may include reading a machine readable code configured to be coupled to a vehicle, connecting to an ELD dongle based, at least in part, on the machine readable code, receiving data from the ELD dongle, and generating one or more mobile device reports based, at least in part, on the received data.

11 Claims, 19 Drawing Sheets

Related U.S. Application Data

(60) Provisional application No. 62/400,881, filed on Sep. 28, 2016, provisional application No. 62/395,728, filed on Sep. 16, 2016.

(51) Int. Cl.
  *G06K 7/10* (2006.01)
  *G06K 19/077* (2006.01)
  *G07C 5/08* (2006.01)
  *H04M 1/725* (2021.01)
  *H04M 1/72409* (2021.01)
  *H04M 1/72412* (2021.01)

(52) U.S. Cl.
  CPC ......... *G06K 19/07749* (2013.01); *G07C 5/00* (2013.01); *G07C 5/0808* (2013.01); *G07C 5/0825* (2013.01); *G07C 5/0858* (2013.01); *H04M 1/725* (2013.01); *H04M 1/724098* (2022.02); *H04M 1/72412* (2021.01)

(58) Field of Classification Search
  CPC .......... G07C 5/006; G07C 5/008; G07C 5/08; G07C 5/0808; G07C 5/0816; G07C 5/0841; G07C 5/085; G07C 5/0858
  See application file for complete search history.

(56) References Cited

U.S. PATENT DOCUMENTS

| | | | | |
|---|---|---|---|---|
| 2014/0213238 A1* | 7/2014 | Giraud | ................... | G07C 5/008 |
| | | | | 455/418 |
| 2017/0330396 A1* | 11/2017 | Yehezkel | ............... | G07C 5/008 |
| 2021/0295440 A1* | 9/2021 | Hayward | ............... | G06Q 40/08 |

* cited by examiner

ELECTRONIC LOGGING DEVICE (ELD) APPARATUS, SYSTEM, AND METHOD

CROSS-REFERENCE TO RELATED APPLICATIONS

The present disclosure is a continuation of application Ser. No. 16/334,001 filed on Mar. 15, 2019, which is a 371 national stage of PCT/US17/51853 filed on Sep. 15, 2017, which claims the benefit of U.S. Provisional Patent Application Ser. No. 62/395,728 filed on Sep. 16, 2016, and U.S. Provisional Patent Application Ser. No. 62/400,881 filed on Sep. 28, 2016, the entire disclosure of each being incorporated herein by reference.

TECHNICAL FIELD

The present disclosure is related logging devices and more specifically to electronic logging devices for use with motor vehicles.

BACKGROUND

Vehicle operators may be required to maintain records of their duty status by their employer and/or by legal regulation or law. In some cases, vehicle operators may maintain these records manually by entering, for example, operating time (e.g., drive time) to rest time (e.g., sleep time) into a log book.

However, the accuracy of manually entered records is subject to the diligence and honesty of the vehicle operator. For example, a vehicle operator may intentionally record false entries to extend the time he/she is able to drive. Furthermore, the economics of the transport industry may encourage a vehicle operator to engage in dishonest behavior because it may be economically rewarding. As a result, some vehicle operators may not be well rested when operating a respective vehicle. This may, for example, increase the risk that the vehicle operator may be involved in and/or create an accident and/or traffic incident with and/or between other motorists occupying a roadway.

BRIEF DESCRIPTION OF THE DRAWINGS

These and other features and advantages will be better understood by reading the following detailed description, taken together with the drawings, wherein.

DETAILED DESCRIPTION

The present disclosure is generally directed to an electronic logging device (ELD) system for recording and transmitting data relating to a vehicle. The ELD system may include an ELD dongle configured to be communicatively coupled to a vehicle, a mobile device configured to be communicatively coupled to the ELD dongle, and a remote server configured to be communicatively coupled to the mobile device. The ELD dongle may receive data from the vehicle and transmit the data to the mobile device. The mobile device, upon receiving the data from the ELD dongle, may generate one or more mobile device reports based on the received data. The mobile device may also transmit the received data to the remote server such that the remote server can also generate one or more remote server reports based on the data transmitted by the mobile device.

The ELD dongle may include an ELD head and an ELD base and may be configured to communicatively couple to a diagnostics port of the vehicle. The ELD head may be removably/detachably coupled to the ELD base. This may allow the ELD head to be positioned at a location within the vehicle that is not adjacent to the diagnostics port and/or allow the ELD head to be coupled to multiple ELD bases.

The mobile device may communicatively couple to/establish a connection with the ELD dongle in response to reading a machine readable code (e.g., a quick response code). Once the connection is established, the ELD dongle may encrypt the data that is transmitted to the mobile device. As such, data transmitted using the connection established between the ELD dongle and the mobile device may be resistant to tampering.

Figure 1:
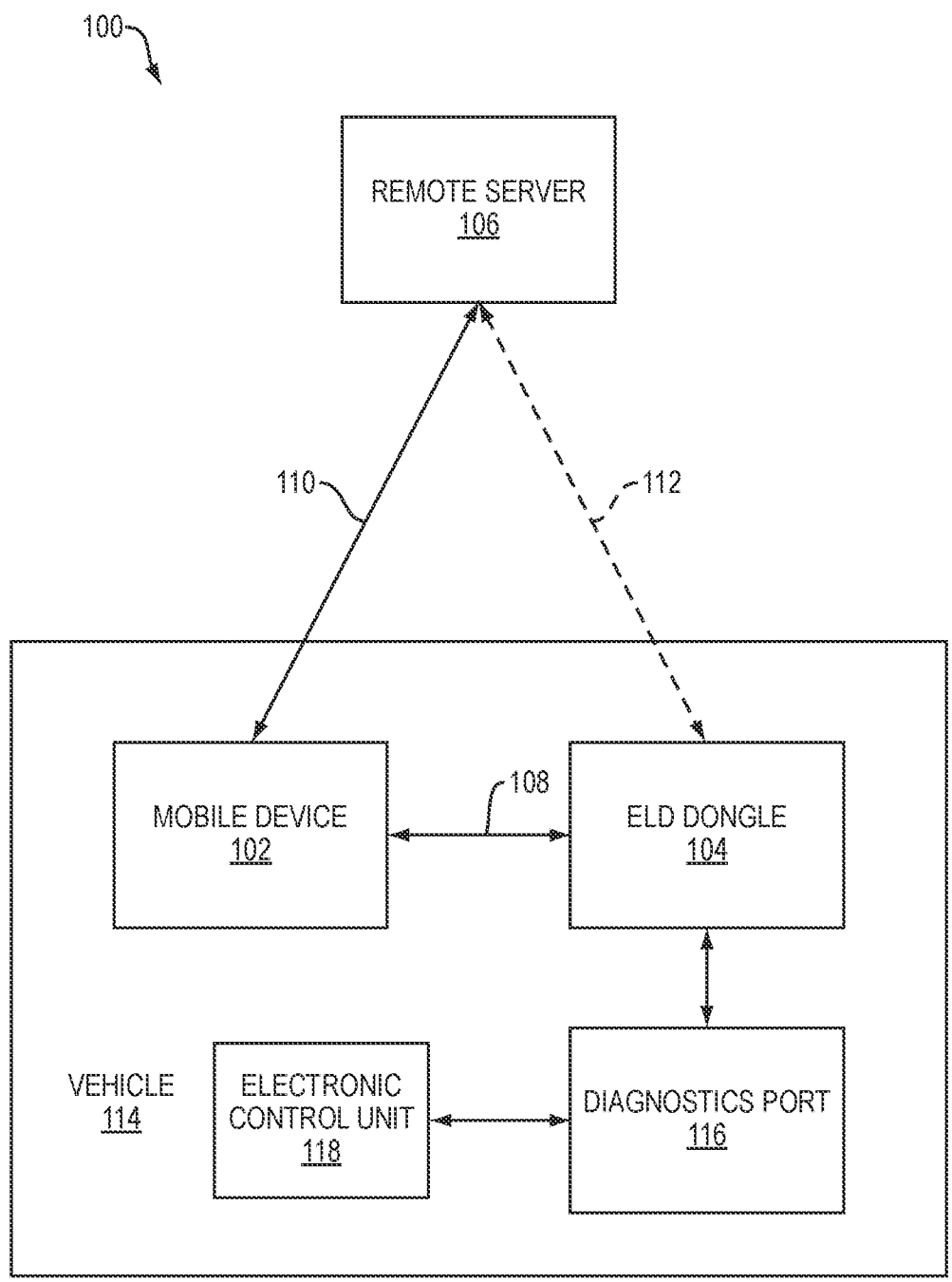
FIG. 1 is a schematic diagram of an example electronic logging device (ELD) system, consistent with embodiments of the present disclosure.

FIG. 1 shows a schematic example of an electronic logging device (ELD) system 100 having a mobile device 102 (e.g., a smartphone, a tablet, a laptop computer, or any other similar device), an ELD dongle 104, and a remote server 106. The mobile device 102 may be in communication with the ELD dongle 104 using a first data connection 108 (e.g., cellular connection, Bluetooth, including low energy Bluetooth, Wi-Fi, Universal Serial Bus (USB), Ethernet, and/or other suitable communication standards). The mobile device 102 may also be in communication with the remote server 106 using a second data connection 110 (e.g., cellular connection, Bluetooth, including low energy Bluetooth, Wi-Fi, Universal Serial Bus, Ethernet, and other suitable communication standards). In an embodiment, the first data connection 108 between the mobile device 102 and the ELD dongle 104 is a Bluetooth connection and the second data connection 110 between the mobile device 102 and/or the remote server 106 is a cellular connection (e.g., GSM, UMTS, LTE, or any other suitable cellular connection). In other words, in some instances, the first data connection 108 may be generally described as a short range data connection and the second data connection 110 may be generally described as a long range data connection.

In some instances, the ELD dongle 104 is capable of communicating directly with the remote server 106 using a third data connection 112 (e.g., cellular connection, Bluetooth, including low energy Bluetooth, including low energy Bluetooth, Wi-Fi, Universal Serial Bus, Ethernet, and/or other suitable communication standards). In one example embodiment, the third data connection 112 between the ELD dongle 104 and the remote server 106 is a cellular connection (e.g., GSM, UMTS, LTE, and/or any other suitable cellular connection).

As shown, the ELD dongle 104 may be communicatively coupled to a vehicle 114 using, for example, a diagnostics port 116 of the vehicle 114. In some instances, the ELD dongle 104 may generally be described as being physically coupled to the vehicle 114 via diagnostics port 116. The diagnostics port 116 may be communicatively coupled to an electronic control unit 118 (e.g., one or more of an engine control module, a transmission control module, a power train control module, a brake control module, a central control module, a central timing module, a general electronic module, a body control module, a suspension control module, and the like) that monitors and/or controls one or more characteristics of the vehicle 114. In other words, the electronic control unit 118 may be generally described as at least generating vehicle data. The diagnostics port 116 may be used to facilitate the ELD dongle 104 communicating with the electronic control unit 118. In some instances, the ELD dongle 104 may generate data in addition to vehicle data received from the electronic control unit 118. For example, the ELD dongle 104 may include one or more sensors (e.g., an accelerometer) for detecting a condition of the vehicle 114. Therefore, the ELD dongle 104 may communicate data generated by the vehicle and data generated by the ELD dongle to the mobile device 102 and/or the remote server 106 using the first and/or third data connections 108 and 112.

The electronic control unit 118 may use a vehicle bus to facilitate communication between components in the vehicle 114 using a communication standard. In some instances, a different communication standard may be used by different vehicle types (e.g., light, medium, and heavy trucks may all use different communication standards). For example, the communication standard may be a J1708 standard on a RS485 bus, a J1587 standard on a RS485 bus, a J1939 standard on a controller area network (CAN) bus, a J15765 standard on a CAN bus, a J1587 standard on a J1708 bus, or any other suitable standard and/or suitable bus. In other words, each bus type and/or vehicle type may utilize a different communication standard. Accordingly, in some instances, the ELD dongle 104 may be capable of identifying which communication standard is being used by the bus. In some instances, the ELD dongle 104 may automatically (e.g., without user interaction) determine which communication standard is being utilized by the bus. This may prevent the ELD dongle 104 from interfering with the operation of, for example, the electronic control unit 118.

In some instances, the electronic control unit 118 may broadcast data related to the monitored characteristics to any device coupled to the diagnostics port 116. In other words, data related to monitored characteristics is automatically transmitted to the ELD dongle 104 when the ELD dongle 104 is communicatively coupled to the diagnostics port 116. In these instances, the ELD dongle 104 may determine the communication standard by comparing the broadcast data signals to a plurality of know data signals associated with a respective communication standard. In other instances, the electronic control unit 118 may only transmit data related to monitored characteristics upon receiving a request from a device coupled to the diagnostics port 116. In other words, data related to the monitored characteristics will only be transmitted to the ELD dongle 104 when the ELD dongle 104 is connected to the diagnostics port 116 and makes a request to receive data related to the monitored characteristics. In these instances, the ELD dongle 104 may determine the communication standard by transmitting a plurality of requests for data until a desired response is received, wherein each of the plurality of requests is associated with a different communication standard.

The diagnostics port 116 may include, for example, an onboard diagnostics port-II (OBD-II) connector, a Deutsch 6-pin connector, or a Deutsch 9-pin connector, or any other suitable diagnostic port connector. The data provided to the ELD dongle 104 via the diagnostics port 116 may include speed data (e.g., wheel speed in miles per hour), ignition status data, revolutions per minute (RPM) of the engine (e.g., engine speed), total miles, brake status, clutch status, and/or any other diagnostic data.

In some instances, the ELD dongle 104 may be synchronized with the engine and/or motor of the vehicle 114 such that the ELD dongle 104 may record engine/motor synchronization data. In other words, the ELD dongle 104 may automatically capture one or more of, for example, the operational status of the engine and/or motor, the speed of the vehicle 114 (and/or an indicator as to whether or not the vehicle 114 is moving), the total number of hours that the engine and/or motor of the vehicle 114 has operated over the life of the vehicle 114, the total number of miles the vehicle 114 has traveled over the life of the vehicle 114, and the like. When the ELD dongle 104 is connected and/or disconnected from the diagnostics port 116, a time stamp may be included for any data collected. For example, a time stamp may be included with the engine/motor synchronization data when the ELD dongle 104 is disconnected from the diagnostics port 116.

While the ELD system 100 of FIG. 1 only illustrates a single vehicle 114, a single remote server 106, and a single mobile device 102, the ELD system 100 is not limited to such a configuration. For example, the ELD system 100 may include two or more vehicles 114, ELD dongles 104, and/or mobile devices 102. In some instances, two or more remote servers 106 may be used. Therefore, although the present disclosure may describe some features in the context of a single vehicle 114, a single ELD dongle 104, a single mobile device 102, and/or a single remote server 106 it is only for the purposes of clarity and not for the purposes of limitation. In other words, any of the features described herein may be applied to an ELD system 100 including any number of vehicles 114, ELD dongles 104, mobile devices 102, and/or remote servers 106.

Figure 2:
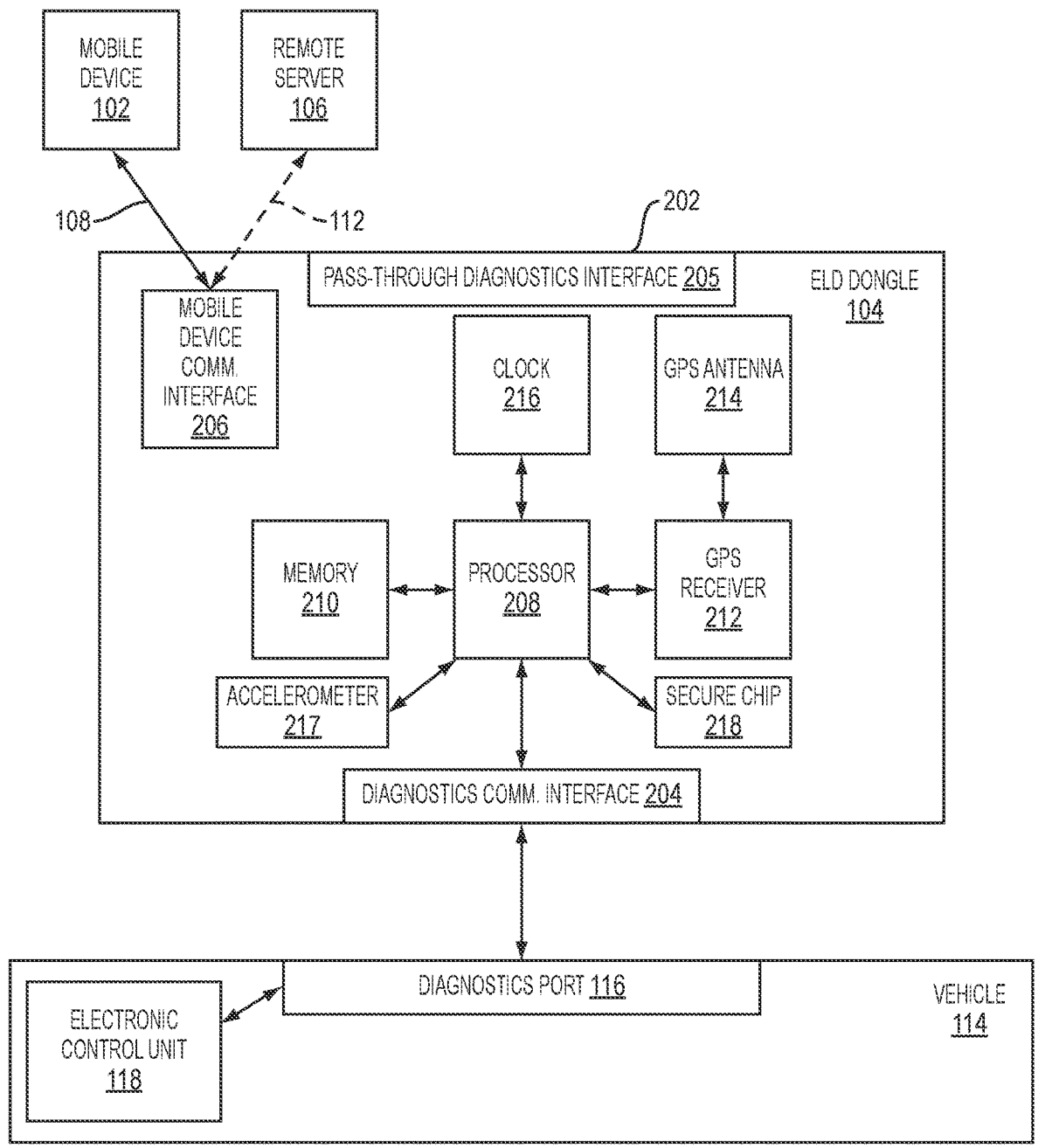
FIG. 2 is a schematic diagram of an example ELD dongle communicatively coupled to the ELD system of FIG. 1, consistent with embodiments of the present disclosure.

FIG. 2 shows a schematic example of an embodiment of the ELD dongle 104 of FIG. 1. As shown, the ELD dongle 104 may include a housing 202, a diagnostics communication interface 204, and a mobile device communication interface 206. The diagnostics communication interface 204 may be at least partially enclosed by the housing 202 and may be communicatively coupled to the diagnostics port 116 of FIG. 1 such that the ELD dongle 104 is capable of receiving vehicle data from the vehicle 114. The diagnostics communication interface 204 may be compatible with an OBD-II connector, a Deutsch 6-pin connector, a Deutsch 9-pin connector, or any other suitable diagnostic port connector. The mobile device communication interface 206 may be communicatively coupled to the mobile device 102 of FIG. 1. Therefore, the mobile device communication interface 206 may be compatible with a cellular connection (e.g., GSM, UMTS, LTE, or any other suitable cellular connection), Bluetooth (including low energy Bluetooth), Wi-Fi, Universal Serial Bus, Ethernet, and/or other suitable communication standards that may facilitate communication with the mobile device 102. However, if the mobile device communication interface 206 utilizes a cellular network (e.g., GSM, UMTS, LTE, and/or any other suitable cellular connection) the mobile device communication interface 206 may communicate directly with the remote server 106 of FIG. 1 without necessarily communicating with the mobile device 102.

In some instances, the ELD dongle 104 may include a pass-through diagnostics interface 205 at least partially enclosed by the housing 202. The pass-through diagnostics interface 205 may be communicatively coupled to the diagnostics port 116 of the vehicle 114 such that when the ELD dongle 104 is coupled to the diagnostics port 116, the diagnostics port 116 is still accessible for diagnostics purposes. In other words, the ELD dongle 104 does not need to be removed in order for an additional device to be communicatively coupled to the diagnostics port 116. Therefore, the pass-through diagnostics interface 205 may be compatible with an OBD-II connector, a Deutsch 6-pin connector, or a Deutsch 9-pin connector, or any other suitable diagnostic port connector.

As shown, the ELD dongle 104 may include a processor 208 in communication with a memory 210. The memory 210 may store instructions for the operation of the ELD dongle 104 and/or may store data received from the electronic control unit 118 of FIG. 1. In some instances, the memory 210 may store one or more instructions and/or databases that allow the ELD dongle 104 to automatically determine the communication protocol used by the bus for the electronic control unit 118. For example, the ELD dongle 104 may receive data from the electronic control unit 118 and, based on the received data, determine, using the processor 208 and the memory 210, which communication protocol is being used. When the communication protocol is determined, the ELD dongle 104 may transmit the data to, for example, the mobile device 102. In some instances, the ELD dongle 104 may include circuitry and/or one or more instructions stored in the memory 210 capable of ensuring proper timing between the ELD dongle and the electronic control unit 118 and/or that provides error handling capabilities in the event of an error during communication between the ELD dongle 104 and the electronic control unit 118.

The data transmitted to the mobile device 102 may be converted to a format usable, for example, by the mobile device 102 by the ELD dongle 104 using at least the processor 208 and the memory 210 prior to sending the data to the mobile device 102. In some instances, the ELD dongle 104 may transmit the data directly to the mobile device 102 without conversion. As such, in some instances, the mobile device 102 may convert the data received from the electronic control unit 118 or may use the data without conversion.

In some instances, the memory 210 may store data received from the electronic control unit 118. For example, the memory 210 may store data received from the electronic control unit 118 when the first data connection 108 between the mobile device 102 and the ELD dongle 104 and/or the third data connection 112 between the remote server 106 and the ELD device 104 has not been established and/or is not functioning. When the first and/or third data connection 108 and 112 is restored, the data stored on the memory 210 may be transferred to the mobile device 102 and/or the remote server 106 and erased from the memory 210. In some instances, the memory 210 may retain data received from the electronic control unit 118 for a predetermined period of time (e.g., 1 month, 2 months, 4 months, 6 months, and/or any other suitable period of time). The memory 210 may have a storage capacity of, for example, 4 megabytes (MB) 8 MB, 16 MB, 128 MB, 256 MB, or any other suitable storage capacity.

The memory 210 may also include instructions that, when executed by the processor 208, identify an operator of the vehicle 114 of FIG. 1. For example, the mobile device 102 may transmit identifying information to the ELD dongle 104. The ELD dongle 104 may then associate the present operation of the vehicle 114 with the operator possessing the mobile device 102. The identifying information transmitted by the mobile device 102 may be generated when, for example, the operator of the vehicle 114 enters identifying information (e.g., a user name and/or password) into an application executing on the mobile device 102. Additionally, or alternatively, the mobile device 102 may associate the received data with an identifier corresponding to the operator of the vehicle 114 in response to the ELD dongle 104 identifying the operator of the vehicle 114. If, however, the ELD dongle 104 does not receive identifying information, the ELD dongle 104 may still record the data but associate the data with an unidentified operator identifier. In these instances, the operator of the vehicle 114 may manually associate the received data with his/her identifier at a later time.

In some instances, multiple individuals may be present in the vehicle 114. Each individual may possess a mobile device 102 capable of communicating with the ELD dongle 104, however, only a single individual may be capable of having operator status. In this instance, the memory 210 may include instructions that when executed by the processor 208, cause the ELD dongle 104 to identify an operator of the vehicle 114 and a passenger of the vehicle 114. This may be done, for example, by each individual signing into an application on the mobile device 102 and entering the position they will be occupying (e.g., operator or passenger). In some instances, for example, when the mobile devices 102 communicate with the ELD dongle 104 using a wireless connection (such as Bluetooth), the ELD dongle 104 may determine a status of the individuals within the vehicle 114 based on proximity to the ELD dongle 104. This may be accomplished, for example, by measuring and comparing the signal strengths of the wireless signals connecting the mobile devices 102 to the ELD dongle 104. In some instances, the mobile device 102 having the strongest signal strength may be assumed to be the mobile device 102 belonging to the operator of the vehicle 114.

As shown, the ELD dongle 104 may further include a global positioning system (GPS) receiver 212 capable of connecting to a GPS network. The GPS receiver 212 may include and/or be electrically coupled to a GPS antenna 214. In some instances, the GPS antenna 214 may be positioned at a location external to the ELD dongle 104 (e.g., outside the vehicle 114). The GPS receiver 212 may allow the ELD dongle 104 to record the position of the vehicle 114. The position of the vehicle 114 may be used to determine, for example, the speed of the vehicle 114, the distance traveled by the vehicle 114, the route traveled by the vehicle 114, and/or other similar data. In some instances, the GPS receiver 212 may receive clock data from the GPS network. Therefore, the GPS receiver 212 may be used, for example, to calculate a time that the vehicle 114 is operating (e.g., the engine and/or motor is active) and a time that the vehicle 114 is not operating (e.g., the engine and/or motor is inactive). In some instances, the clock data may be used, for example, to generate one or more time stamps.

As also shown, the ELD dongle 104 may include a clock 216. The clock 216 may be a hardware clock, a software clock, or a combination thereof. For example, the clock 216 may include circuitry capable of measuring elapsed time. The elapsed time may be a measure of time when the engine and/or motor for the vehicle 114 is active and/or the elapsed time may be a measure of time when the engine and/or motor for the vehicle is inactive. In other words, the clock 216 may be used, at least in part, in determining on-duty time and off-duty time for an operator of the vehicle 114. In some instances, the clock 216 may be a software clock based on instructions stored in the memory 210. In these instances, the clock 216 may be based on the clock cycles of the processor 208.

When the clock 216 is included, the time the engine and/or motor of the vehicle 114 is active may be recorded even when the GPS receiver 212 has yet to connect to the GPS network. In other words, timing data can be collected when the vehicle is either not able to connect to the GPS network or is attempting to connect to the GPS network. This may be beneficial to the operation of the ELD dongle 104 because, to conserve power, the ELD dongle 104 may deactivate the GPS receiver 212 when the engine and/or motor of the vehicle 114 is inactive. Therefore, when the engine and/or motor becomes active, the GPS receiver 212 may have to reconnect to the GPS network upon receiving power. As a result, during the reconnection period the clock 216 may provide time data. For example, the clock 216 may be used to generate one or more time stamps when the ELD dongle 104 is connected and/or disconnected from the diagnostics port 116.

As shown, the ELD dongle 104 may include an accelerometer 217. The accelerometer 217 may be used to detect rapid and/or sudden deceleration of the vehicle 114. The rapid and/or sudden deceleration of the vehicle 114 may indicate the occurrence of a traffic incident and/or accident. In response to a rapid and/or sudden deceleration the ELD dongle 104 may save data received from the electronic control unit 118 in the memory 210 such that the ELD dongle 104 operates similar to a black box recorder (or traffic incident recorder). In other words, the ELD dongle 104 may be generally described as generating an incident record. For example, the ELD dongle 104 may save data received from the electronic control unit 118 from at least two minutes prior to the detected rapid and/or sudden deceleration to at least ten seconds after the detected rapid and/or sudden deceleration to the memory 210. As such, this data may be later analyzed to determine, at least partially, the circumstances surrounding the traffic incident and/or accident. Additionally, or alternatively, in some instances, the black box data may be stored in the mobile device 102.

In some instances, the ELD dongle 104 may include a secure chip 218. The secure chip 218 may be used to encrypt communications and/or data (e.g., vehicle data) transmitted from the ELD dongle 104. For example, the secure chip 218 may encrypt data transmitted over the first data connection 108 between the mobile device 102 and the ELD dongle 104. The secure chip 218 may also be used to encrypt data stored in the memory 210. For example, the secure chip 218 may encrypt operational data (e.g., vehicle data, data gathered by one or more sensors of the ELD dongle 104, and/or any other operational data) of the vehicle 114 associated with an operator of the vehicle 114. By encrypting the operational data of the vehicle 114, the operator of the vehicle 114 may be prevented from tampering with the data. This may ensure that accurate details regarding the operation of the vehicle 114 are stored. For example, when an operator of the vehicle 114 is required to maintain a hours of service (HOS) log/report, the encryption may prevent the operator from altering data recorded by the ELD dongle 104 that relates at least to HOS log/report.

In some instances, the secure chip 218 may be used to verify an identity of an operator of the vehicle 114. For example, the ELD dongle 104 may store an operator's login credentials in the memory 210 and/or the secure chip 218. Therefore, the secure chip 218 may encrypt the login credentials stored on the memory 210 or may store the login credentials in secure memory within the secure chip 218. As a result, an operator of the vehicle 114 and/or a third party may be prevented from altering and/or gaining access to the login credentials used to verify an identity of an operator of the vehicle 114. This may be beneficial if, for example, the login credentials used to verify the identity of the operator of the vehicle 114 are the same as the login credentials to allow the operator of the vehicle 114 to access the remote server 106.

In some instances, the secure chip 218 may be used to verify authenticity of firmware updates to be installed on the ELD dongle 104. For example, the secure chip 218 may verify the authenticity of firmware updates based, at least in part, on one or more digital signatures.

The various encryption functions may utilize one or more of asymmetric cryptography (e.g., elliptic curve cryptography with NIST or Brainpool 256-bit and/or 384-bit curves, elliptic curve digital signature algorithm with SHA-256 and/or SHA-384, elliptic curve Diffie-Hellman, and/or other suitable asymmetric cryptographic approaches), symmetric cryptography (e.g., key wrapping using AES-128/AES-256, secure channel protocols using AES-128, and/or other suitable symmetric cryptographic approaches), and/or any other suitable cryptographic approach. In some instances the secure chip 218 may include a secure operating system.

One example of the secure chip 218 is the STSAFE-A100 (manufactured by STMicroelectronics NV, headquarter in Geneva Switzerland). However, the present disclosure is not limited to using the STSAFE-A100 as the secure chip 218. Instead, the STSAFE-A100 merely represents one illustrative example of the secure chip 218 and any suitable chip may be used.

Figure 3:
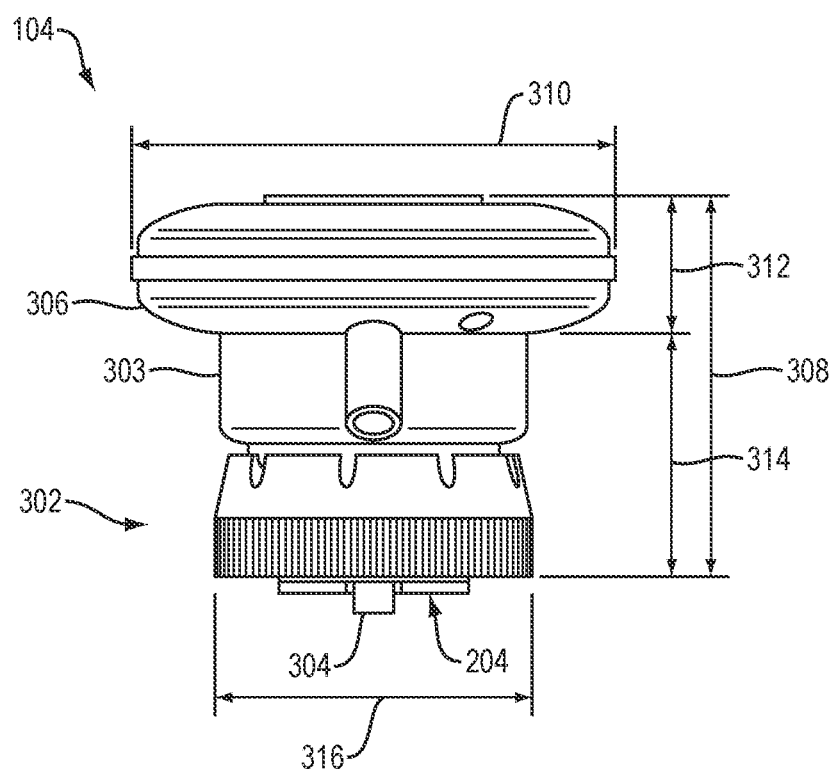
FIG. 3 is a plan view of an example of the ELD dongle of FIG. 2, consistent with embodiments of the present disclosure.

FIG. 3 shows an embodiment of the ELD dongle 104 of FIG. 1 and/or FIG. 2. As shown, the diagnostics communication interface 204 of the ELD dongle 104 may be positioned at a connection end 302 of an ELD dongle base 303 of the ELD dongle 104. The connection end 302 may include a diagnostic port connector 304 that corresponds to an OBD-II connector, a Deutsch 6-pin connector, a Deutsch 9-pin connector, or any other suitable diagnostic port connector. The ELD dongle 104 may also include an ELD head 306. The ELD head 306 may be coupled to the ELD dongle base 303 and may be electrically coupled to the diagnostic port connector 304. The ELD head 306 may include one or more of the mobile device communication interface 206, the processor 208, the memory 210, the GPS receiver 212, the GPS antenna 214, the clock 216, the accelerometer 217, the secure chip 218, and/or any other suitable component.

As shown, the ELD dongle 104 may have a dongle height 308 and a dongle width 310. The dongle height 308 and the dongle width 310 may be selected such that the ELD dongle 104 may be positioned within the vehicle 114 without substantially interfering with the operation of the vehicle 114. For example, a ratio of the dongle height 308 to the dongle width 310 may be in a range of 1:2 to 1:4. More specifically, a ratio of the dongle height 308 to the dongle width 310 may be in a range of 3:4 to 1:1. By way of further example, the dongle height 308 may measure in a range of 45 millimeters (mm) to 50 mm and the dongle width 310 may measure in a range of 55 mm to 65 mm. More specifically, the dongle height 308 may measure 48.0 mm and the dongle width 310 may measure 61.2 mm.

As also shown, an ELD head height 312 may be less than a separation distance 314 between the ELD head 306 and the connection end 302. For example, a ratio of the ELD head height 312 to the separation distance 314 may be in a range of 1:2 to 1:5. More specifically, a ratio of the ELD head height 312 to the separation distance 314 may be in a range of 1:2 to 1:3.

In some instances, the dongle width 310 may be greater than a connector width 316. For example, a ratio of the dongle width 310 to the connector width 316 may be in a range of 1:1 to 2:1. More specifically, a ratio of the dongle width 310 to the connector width 316 may be in a range of 4:3 to 5:3.

Figure 4:
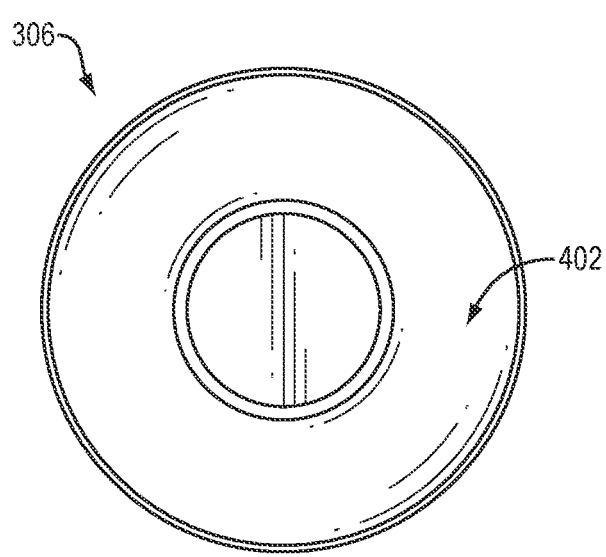
FIG. 4 is a plan view of an example of the ELD head which may be capable of being used with the ELD dongle of FIG. 2, consistent with embodiments of the present disclosure.

FIG. 4 shows an embodiment of the ELD head 306. As shown, the ELD head 306 may have a circular geometry. However, such a geometry is non-limiting. For example, the ELD head 306 may have a square, rectangular, triangular, hexagonal, pentagonal, and/or any other suitable geometric shape. In some instances, an operator facing surface 402 of the ELD head may include one or more status indicators (e.g., light emitting diodes) for displaying information regarding the ELD dongle 104. The status indicators may indicate, for example, an existence of a connection status between the mobile device 102 and the ELD dongle 104 and/or a connection status between the ELD dongle 104 and the electronic control unit 118. In some instances, the status indicator may include a liquid crystal display (LCD), an organic light emitting diode (OLED) display, and/or any other suitable display.

Figure 5C:
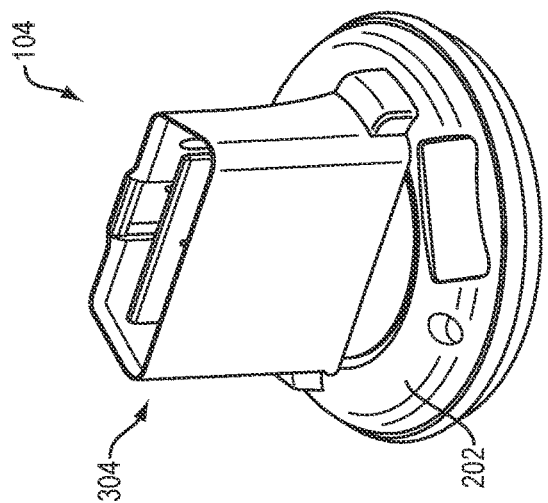
FIG. 5C is a perspective view of an embodiment of the ELD dongle of FIG. 2 having an OBD-II connector, consistent with embodiments of the present disclosure.
Figure 5B:
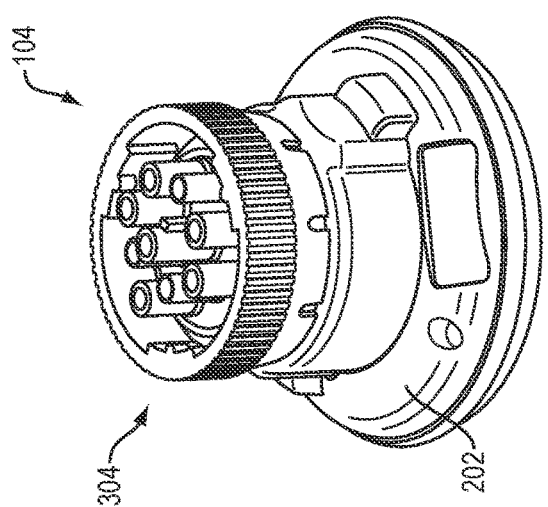
FIG. 5B is a perspective view of an embodiment of the ELD dongle of FIG. 2 having a Deutsch 9-pin connector, consistent with embodiments of the present disclosure.
Figure 5A:
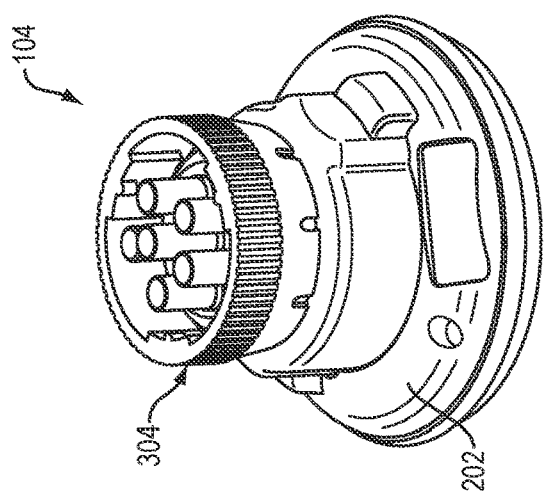
FIG. 5A is a perspective view of an embodiment of the ELD dongle of FIG. 2 having a Deutsch 6-pin connector, consistent with embodiments of the present disclosure.

FIG. 5A shows an embodiment of the ELD dongle 104, wherein the diagnostic port connector 304 includes a Deutsch 6-pin connector. FIG. 5B shows an embodiment of the ELD dongle 104, wherein the diagnostic port connector 304 includes a Deutsch 9-pin connector. FIG. 5C shows an embodiment of the ELD dongle 104, wherein the diagnostic port connector 304 includes an OBD-II connector. In some instances, the ELD dongle base 303 is coupled to the ELD head 306 such that the ELD head 306 is not interchangeable with multiple diagnostic port connectors 304. In other words, the ELD dongle 104 can only be connected to a single type of diagnostics port (e.g., Deutsch 6-pin, Deutsch 9-pin, OBD-II, or any other suitable diagnostics port).

Figure 6B:
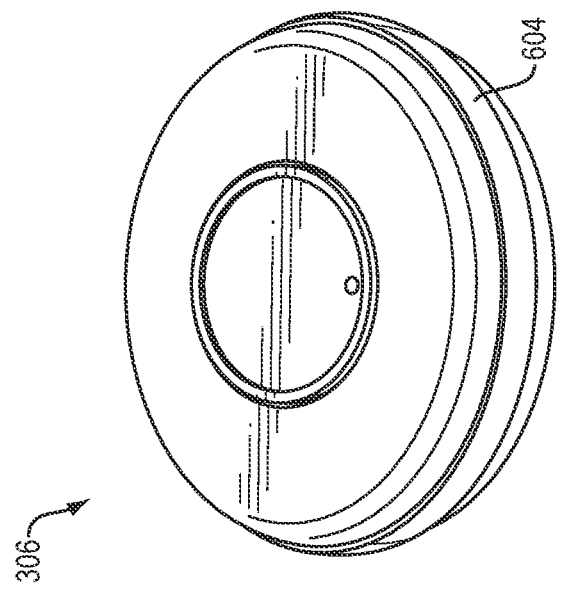
FIG. 6B is another perspective view of an embodiment of an interchangeable head which may form at least part of the ELD dongle of FIG. 2, consistent with embodiments of the present disclosure.
Figure 6A:
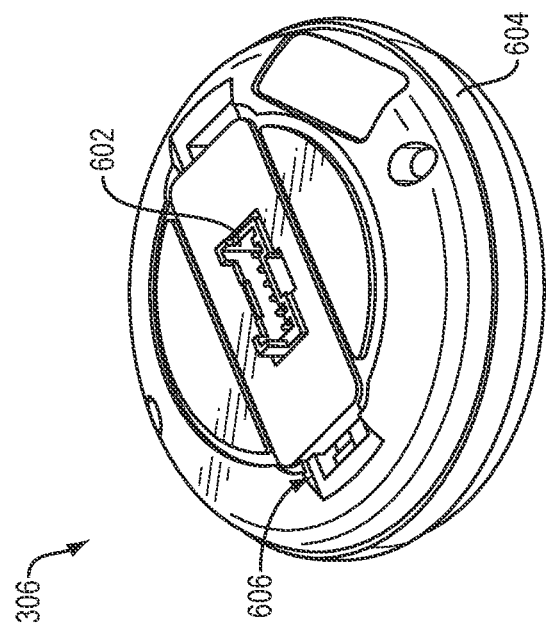
FIG. 6A is a perspective view of an embodiment of an interchangeable head which may form at least part of the ELD dongle of FIG. 2, consistent with embodiments of the present disclosure.

FIGS. 6A and 6B show an embodiment of the ELD head 306 that is capable of being electrically coupled to multiple diagnostic port connectors 304. Therefore, the ELD dongle 104 may include interchangeable ELD dongle bases 303, each having a different type of diagnostic port connector 304. In other words, the ELD head 306 is detachably coupled to a respective ELD dongle base 303. As shown, the ELD head 306 may include an ELD head connector 602 capable of being electrically coupled to the diagnostic port connector 304. In some instances, the ELD head connector 602 may be a male connector. Therefore, the ELD head connector 602 may be received within a corresponding female connector electrically coupled to one of the diagnostics port connectors 304 that may correspond to a respective interchangeable ELD dongle base 303. However, in some instances, the ELD head connector 602 may be a female connector capable of receiving a corresponding male connector.

The ELD head 306 may include an ELD head housing 604. The ELD head housing 604 may include a head mechanical connector 606. The head mechanical connector 606 may be used to mechanically couple the ELD head 306 to, for example, the ELD dongle base 303 (e.g., by a snap-fit, a friction-fit, and/or a similar form of connection). In some instances, the head mechanical connector 606 may couple an electrical connector that includes, for example, a conductive medium, to the ELD head 306. Regardless, the head mechanical connector 606 may prevent or otherwise mitigate the risk that the electrical connection between the ELD head 306 and the diagnostic port connector 304 will be unintentionally broken during operation of the ELD dongle 104.

Figure 7C:
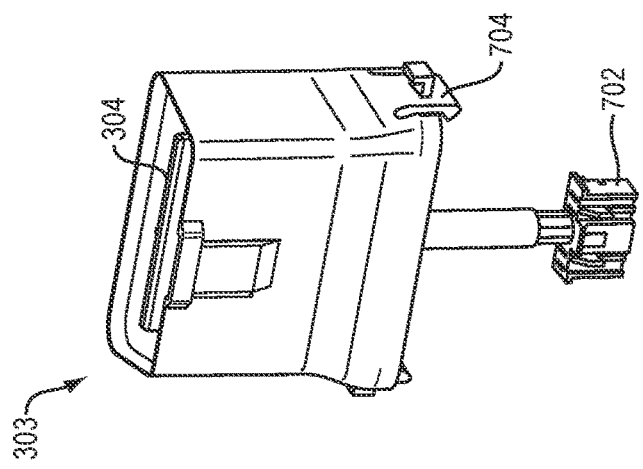
FIG. 7C shows an embodiment of an interchangeable dongle base having a OBD-II connector capable of being used with the interchangeable head of FIG. 6A and/or FIG. 6B, consistent with embodiments of the present disclosure.
Figure 7B:
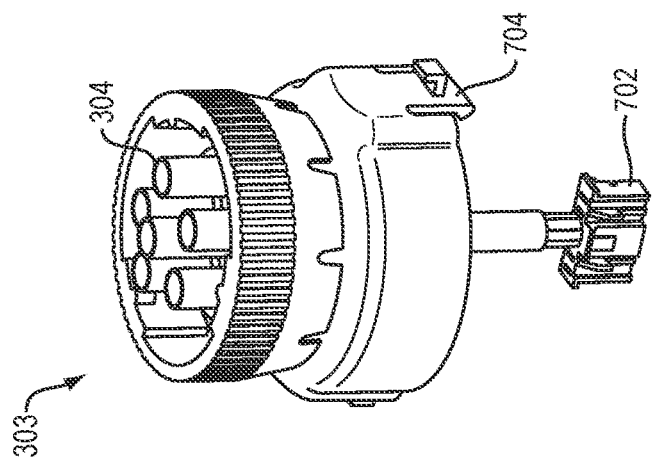
FIG. 7B shows an embodiment of an interchangeable dongle base having a Deutsch 6-pin connector capable of being used with the interchangeable head of FIG. 6A and/or FIG. 6B, consistent with embodiments of the present disclosure.
Figure 7A:
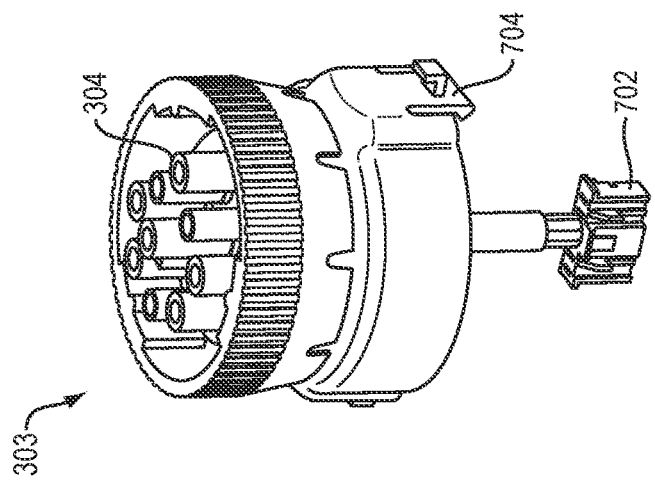
FIG. 7A shows an embodiment of an interchangeable dongle base having a Deutsch 9-pin connector capable of being used with the interchangeable head of FIG. 6A and/or FIG. 6B, consistent with embodiments of the present disclosure.

FIG. 7A shows an embodiment of an interchangeable ELD dongle base 303, wherein the diagnostics port connector 304 is a Deutsch 9-pin connector. As shown, the ELD dongle base 303 includes an ELD dongle base connector 702 electrically coupled to the diagnostics port connector 304. The ELD dongle base connector 702 may correspond to, for example, the ELD head connector 602. As shown, the ELD dongle base 303 may include a base mechanical connector 704 that corresponds to, for example, the head mechanical connector 606.

FIG. 7B shows an embodiment of an interchangeable ELD dongle base 303, wherein the diagnostics port connector 304 is a Deutsch 6-pin connector. As shown, the ELD dongle base 303 includes an ELD dongle base connector 702 electrically coupled to the diagnostics port connector 304. The ELD dongle base connector 702 may correspond to, for example, the ELD head connector 602. As shown, the ELD dongle base 303 may include a base mechanical connector 704 that corresponds to, for example, the head mechanical connector 606.

FIG. 7C shows an embodiment of an interchangeable ELD dongle base 303, wherein the diagnostics port connector 304 is an OBD-II connector. As shown, the ELD dongle base 303 includes an ELD dongle base connector 702 electrically coupled to the diagnostics port connector 304. The ELD dongle base connector 702 may correspond to, for example, the ELD head connector 602. As shown, the ELD dongle base 303 may include a base mechanical connector 704 that corresponds to, for example, the head mechanical connector 606.

Figure 8A:
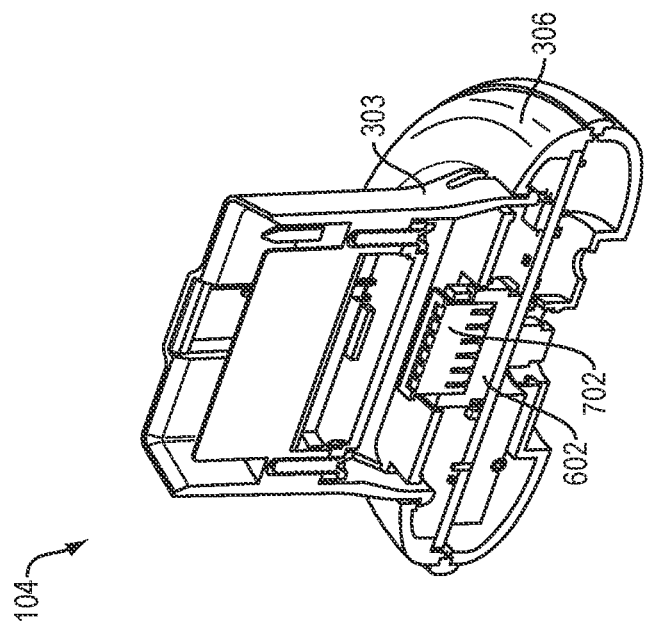
FIG. 8A shows a cross-sectional view of an example of the ELD dongle of FIG. 2 having an interchangeable dongle base with a Deutsch 9-pin connector communicatively coupled to an interchangeable head, consistent with embodiments of the present disclosure.

FIG. 8A shows a cross-sectional view of an example of the ELD dongle 104 including the interchangeable ELD dongle base 303, which may include a Deutsch 9-pin connector. As shown, the ELD head 306 includes the ELD head connector 602 electrically coupled to a corresponding ELD dongle base connector 702 within the ELD dongle base 303. The ELD dongle base connector 702 may be electrically coupled to the diagnostics port connector 304.

Figure 8B:
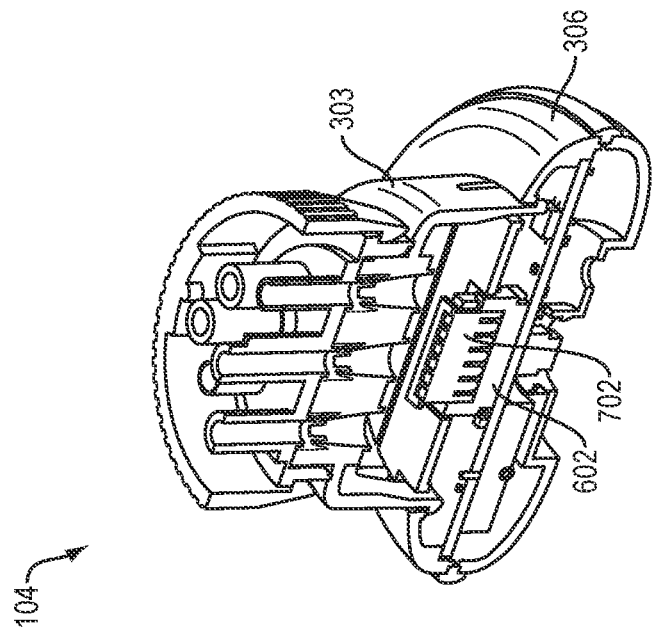
FIG. 8B shows a cross-sectional view of an example of the ELD dongle of FIG. 2 having an interchangeable dongle base with an OBD-II connector communicatively coupled to an interchangeable head, consistent with embodiments of the present disclosure.

FIG. 8B shows a cross-sectional view of another example of the ELD dongle 104 including the interchangeable ELD dongle base 303, which may include an OBD-II connector. As shown, the ELD head 306 includes the ELD head connector 602 electrically coupled to a corresponding ELD dongle base connector 702 within the ELD dongle base 303. The ELD dongle base connector 702 may be electrically coupled to the diagnostics port connector 304.

Therefore, in both FIG. 8A and FIG. 8B, the ELD head 306 is removeably coupled to a corresponding interchangeable ELD dongle base 303. As such, if the vehicle 114 includes a diagnostics port 116 that does not correspond to the diagnostics port connector 304 of the ELD dongle 104, the operator of the vehicle 114 may disconnect the interchangeable ELD dongle base 303 from the ELD head 306 and connect an interchangeable ELD dongle base 303 that includes a diagnostics port connector 304 that corresponds to the diagnostics port 116. In some instances, the interchangeable ELD dongle base 303 may facilitate the ELD dongle 104 being used in multiple vehicles 114.

As also shown in FIGS. 8A and 8B, the head mechanical connector 606 forms a snap-fit connection with the ELD dongle base 303. In these instances, a user may disconnect the ELD head 306 from the ELD dongle base 303 by, for example, exerting a compressive force on the sides of the ELD dongle base 303 and exerting a tensile force on the ELD dongle 104.

Figure 9:
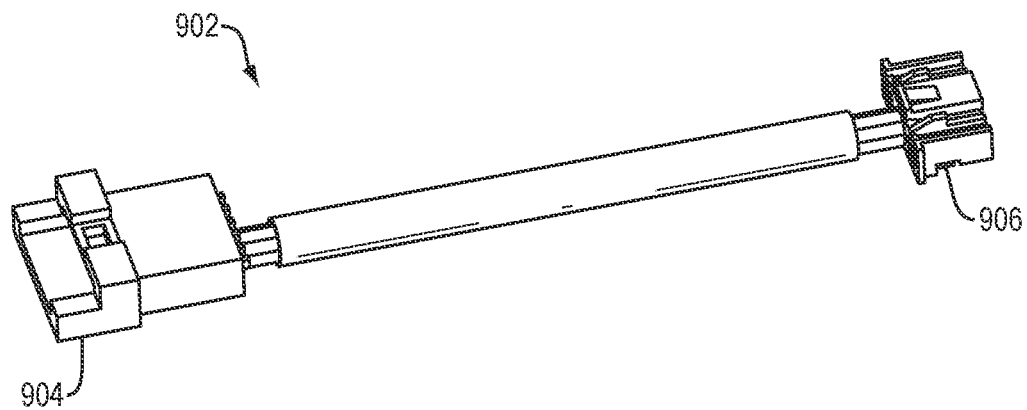
FIG. 9 is a perspective view of a conductive cable which may be capable of communicatively coupling to, for example, interchangeable head of FIG. 6A and/or FIG. 6B, consistent with embodiments of the present disclosure.

In some embodiments, the ELD head 306 may be electrically coupled to the diagnostics port connector 304 using, for example, a conductive cable 902. As shown in FIG. 9, the conductive cable 902 includes a first electrical connector 904 and a second electrical connector 906. The first electrical connector 904 may correspond to the ELD head connector 602 and the second electrical connector 906 may correspond to the ELD dongle base connector 702. In some instances, the second electrical connector 906 may correspond to the diagnostics port 116 of the vehicle 114. Therefore, in some instances, the first and second electrical connectors 904 and 906 may be different. In other instances, the first and second electrical connectors 904 and 906 may be the same.

In operation, the conductive cable 902 electrically couples the ELD head 306 to the diagnostics port connector 304. By coupling the ELD head 306 to the diagnostics port connector 304 using the conductive cable 902, the ELD head 306 may be positioned in locations that are not proximate the diagnostics port 116 of the vehicle 114. For example, in some instances, when the ELD head 306 is coupled to the ELD dongle base 303, the ELD dongle 104 may be physically too large to fit in a location of the vehicle 114 that is proximate to the diagnostics port 116. Therefore, the conductive cable 902 may be used to separate the ELD head 306 from the ELD dongle base 303 such that only the ELD dongle base 303 needs to be positioned in a location proximate to the diagnostics port 116.

Figure 10:
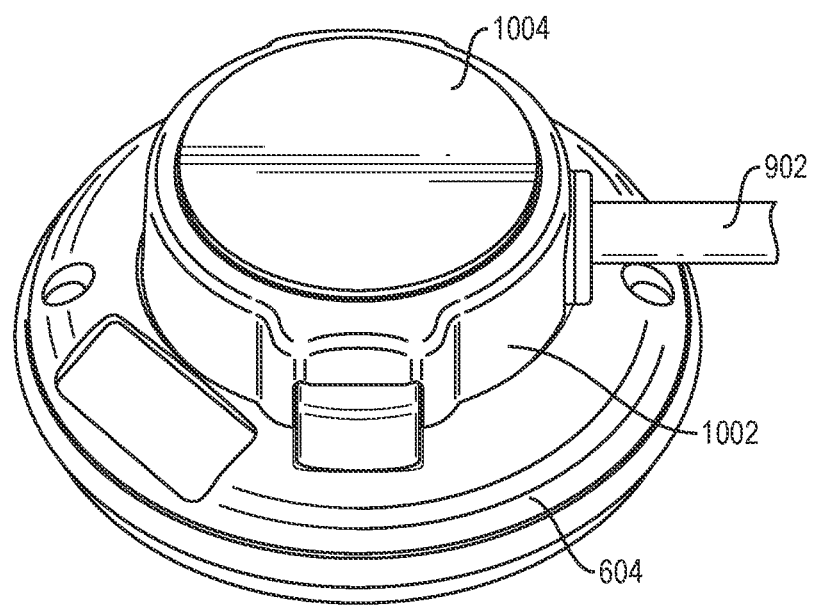
FIG. 10 is a perspective view of an example of the interchangeable head of FIG. 6A and/or FIG. 6B being coupled to the conductive cable of FIG. 9 using a cover, consistent with embodiments of the present disclosure.
Figure 11:
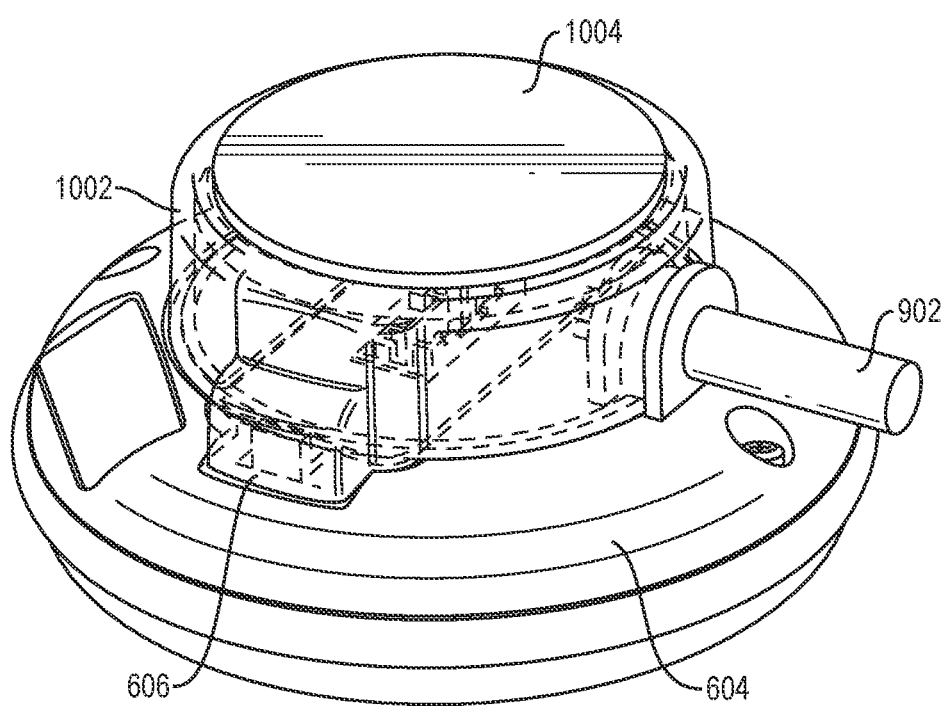
FIG. 11 is a perspective view of another example of the interchangeable head of FIG. 6A and/or FIG. 6B being coupled to the conductive cable of FIG. 9 using a cover, consistent with embodiments of the present disclosure.

As shown in FIGS. 10 and 11, the conductive cable 902 is coupled to the ELD head 306 using a cover 1002. The cover 1002 may be removable such that an operator of the vehicle 114 may disconnect the conductive cable 902 and couple the ELD head 306 directly to, for example, the ELD dongle base 303. Therefore, the cover 1002 may include mechanical connectors capable of engaging the head mechanical connector 606 of the ELD head housing 604. The cover 1002 may include an attachment mechanism 1004 coupled thereto. The attachment mechanism 1004 may be used, for example, to attach the cover 1002 to the vehicle 114. Therefore, the attachment mechanism 1004 may be, for example, any one or more of an adhesive, an adhesive tape, a hook and loop fastener, a mechanical fastener (e.g., a screw, a bolt, a snap-fit, a friction-fit, or other suitable mechanical fastener), a magnetic fastener, or any other suitable form of attachment.

The conductive cable 902 may be electrically coupled to the ELD head connector 602. In some instances, the conductive cable 902 may be electrically coupled to the ELD head connector 602 using the first electrical connector 904 of the conductive cable 902. Therefore, the ELD head 306 may be disconnected from the cover 1002 without damaging the conductive cable 902 and/or the ELD head connector 602. In other instances, the ELD head connector 602 may be coupled to the conductive cable 902 using one or more conductive wires. In these instances, the ELD head 306 may not be removable from the cover 1002 without causing damage to the conductive cable 902 and/or the ELD head connector 602.

While FIG. 11 shows the cover 1002 as transparent, the cover 1002 does not need to be transparent. The cover 1002 is shown as transparent for the purposes of clarity and not by way of limitation.

Figure 12C:
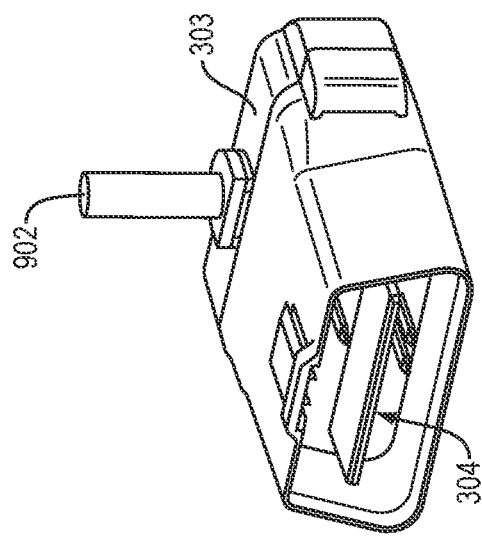
FIG. 12C is a perspective view of an embodiment of an ELD dongle base coupled to, for example, the conductive cable of FIG. 9, wherein the ELD dongle base includes an OBD-II connector, consistent with embodiments of the present disclosure.
Figure 12B:
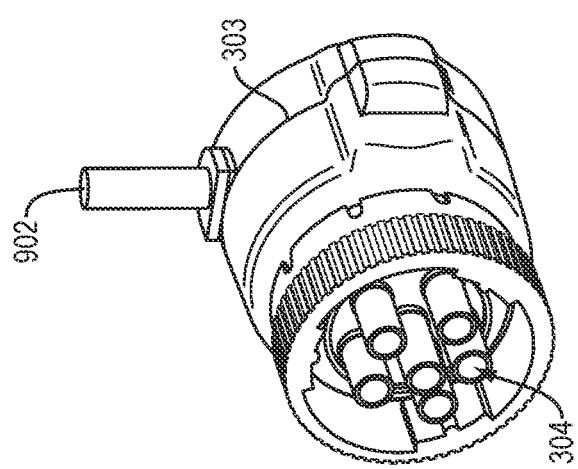
FIG. 12B is a perspective view of an embodiment of an ELD dongle base coupled to, for example, the conductive cable of FIG. 9, wherein the ELD dongle base includes a Deutsch 6-pin connector, consistent with embodiments of the present disclosure.
Figure 12A:
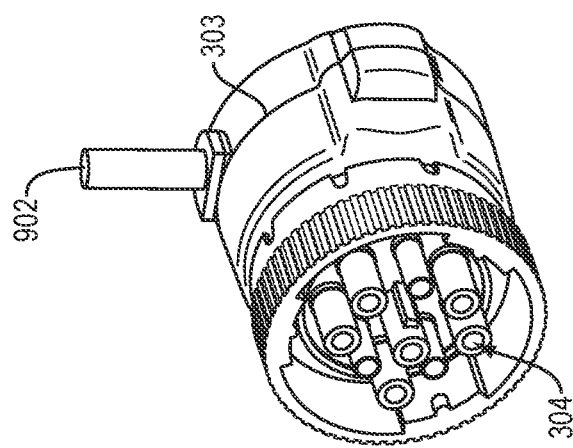
FIG. 12A is a perspective view of an embodiment of an ELD dongle base coupled to, for example, the conductive cable of FIG. 9, wherein the ELD dongle base includes a Deutsch 9-pin connector, consistent with embodiments of the present disclosure.

FIG. 12A shows an embodiment of the ELD dongle base 303 coupled to the conductive cable 902, wherein the diagnostics port connector 304 is a Deutsch 9-pin connector. The conductive cable 902 may be electrically coupled to the diagnostics port connector 304 using, for example, the second electrical connector 906. In these instances, the conductive cable 902 may be removable from the ELD dongle base 303 without causing damage to the conductive cable 902 and/or the diagnostics port connector 304. However, in some instances, the conductive cable 902 may be electrically coupled to the diagnostics port connector 304 using one or more conductive wires. In these instances, the conductive cable 902 may not be removable from the ELD dongle base 303 without causing damage to the conductive cable 902 and/or the diagnostics port connector 304. As shown, the ELD head 306 is not coupled to the ELD dongle base 303. As such, the overall size of the ELD dongle 104 proximate the diagnostics port 116 of the vehicle 114 may be reduced relative to an ELD dongle 104 having the ELD head 306 coupled directly to the ELD dongle base 303.

FIG. 12B shows an embodiment of the ELD dongle base 303 coupled to the conductive cable 902, wherein the diagnostics port connector 304 is a Deutsch 6-pin connector. The conductive cable 902 may be electrically coupled to the diagnostics port connector 304 using, for example, the second electrical connector 906. In these instances, the conductive cable may be removable from the ELD dongle base 303 without causing damage to the conductive cable 902 and/or the diagnostics port connector 304. However, in some instances, the conductive cable 902 may be electrically coupled to the diagnostics port connector 304 using one or more conductive wires. In these instances, the conductive cable 902 may not be removable from the ELD dongle base 303 without causing damage to the conductive cable 902 and/or the diagnostics port connector 304. As shown, the ELD head 306 is not coupled to the ELD dongle base 303. As such, the overall size of the ELD dongle 104 proximate the diagnostics port 116 of the vehicle 114 may be reduced relative to an ELD dongle 104 having the ELD head 306 coupled directly to the ELD dongle base 303.

FIG. 12C shows an embodiment of the ELD dongle base 303 coupled to the conductive cable 902, wherein the diagnostics port connector 304 is an OBD-II connector. The conductive cable 902 may be electrically coupled to the diagnostics port connector 304 using, for example, the second electrical connector 906. In these instances, the conductive cable may be removable from the ELD dongle base 303 without causing damage to the conductive cable 902 and/or the diagnostics port connector 304. However, in some instances, the conductive cable 902 may be electrically coupled to the diagnostics port connector 304 using one or more conductive wires. In these instances, the conductive cable 902 may not be removable from the ELD dongle base 303 without causing damage to the conductive cable 902 and/or the diagnostics port connector 304. As shown, the ELD head 306 is not coupled to the ELD dongle base 303. As such, the overall size of the ELD dongle 104 proximate the diagnostics port 116 of the vehicle 114 may be reduced relative to an ELD dongle 104 having the ELD head 306 coupled directly to the ELD dongle base 303.

Figure 13:
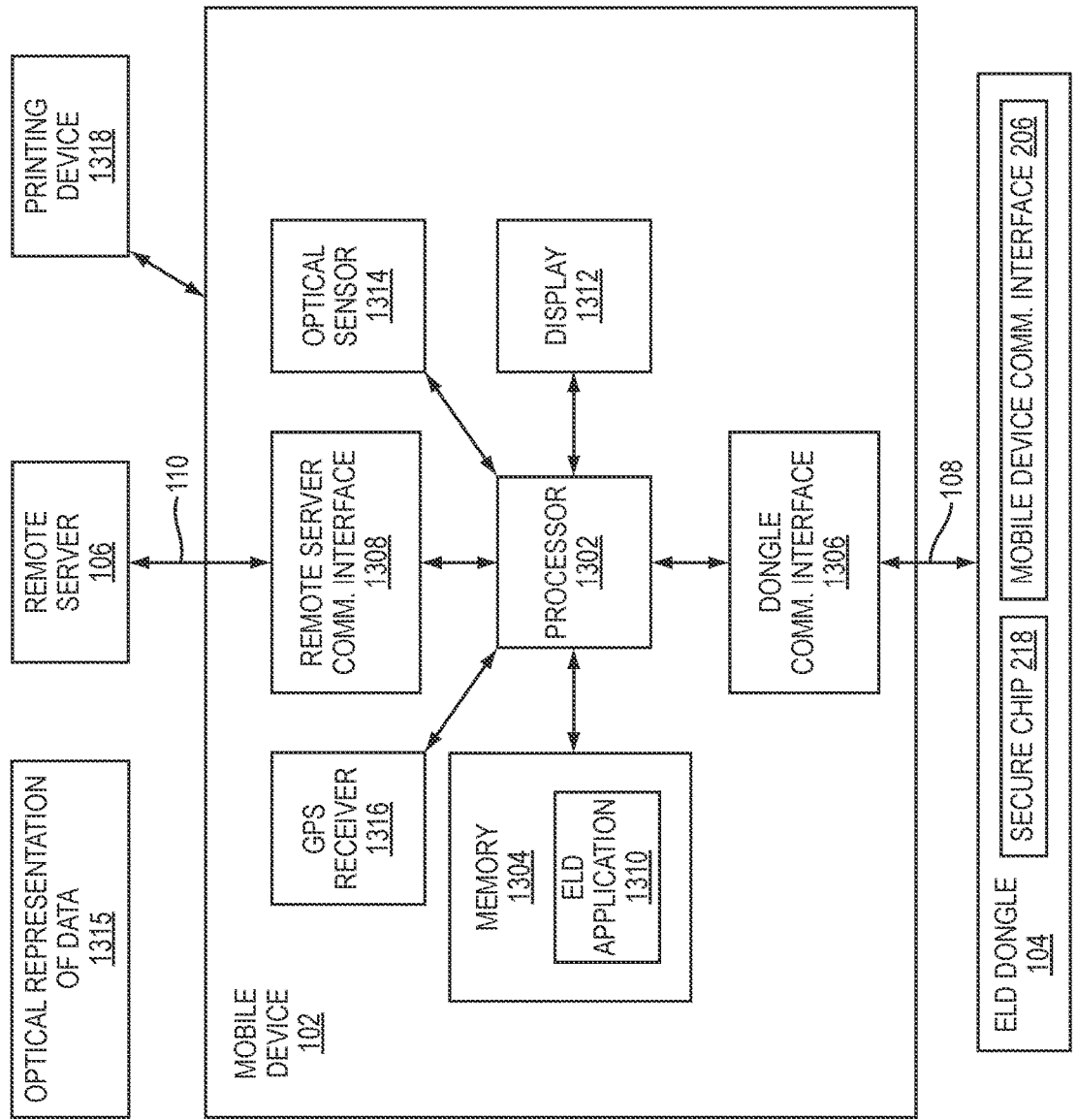
FIG. 13 is a schematic diagram of an example of the mobile device of FIG. 1 communicatively coupled to the ELD system of FIG. 1, consistent with embodiments of the present disclosure.

FIG. 13 shows a schematic example of the mobile device 102. The mobile device 102 may include a processor 1302, a memory 1304, a dongle communication interface 1306, and a remote server communication interface 1308. The dongle communication interface 1306 may be capable of communicating with the ELD dongle 104 using, for example, the first data connection 108. In other words, the dongle communication interface 1306 may be communicatively coupled to the mobile device communication interface 206 of the ELD dongle 104. Therefore, the dongle communication interface 1306 may be compatible with a cellular connection (e.g., GSM, UMTS, LTE, or any other suitable cellular connection), Bluetooth (including low energy Bluetooth), Wi-Fi, Universal Serial Bus, Ethernet, and/or any other suitable communication standards that may facilitate communication with the ELD dongle 104. The remote server communication interface 1308 may be capable of communicating with the remote server 106 using, for example, the second data connection 110. In other words, the remote server communication interface 1308 may be communicatively coupled to the remote server 106. Therefore, the remote server communication interface 1308 may be compatible with a cellular connection (e.g., GSM, UMTS, LTE, or any other suitable cellular connection), Bluetooth (including low energy Bluetooth), Wi-Fi, Universal Serial Bus, Ethernet, and/or any other suitable communication standards that may facilitate communication with the remote server 106.

In operation, the ELD dongle 104 may transmit at least operational data (e.g., vehicle data, data gathered by one or more sensors of the ELD dongle 104, and/or any other data monitored by the ELD dongle 104) related to the vehicle 114 to the mobile device 102 using the dongle communication interface 1306. In other words, the ELD dongle 104 is communicatively coupled to the mobile device 102 such that the mobile device 102 receives the operational data from the ELD dongle 104. As discussed herein, the ELD dongle 104 may encrypt data transmitted to the mobile device 102 using, for example, the secure chip 218. As a result, the data may be resistant to tampering and/or alteration on behalf of the operator of the vehicle 114 and/or a third party. In some instances, the mobile device 102 may encrypt data transmitted to the ELD dongle 104.

In some instances, the received data may then be stored in the memory 1304 for a predetermined period of time. For example, the data may be stored for an hour, a day, a week, a month, a year, or any other suitable period of time. Upon the lapse of the predetermined period of time, the mobile device 102 may transmit the stored data to the remote server 106 and/or may erase/delete the stored data. In some instances, the received data may be stored in the memory 1304 until the mobile device 102 is capable of connecting to, for example, a Wi-Fi or cellular network. Upon connecting to the Wi-Fi or cellular network, the mobile device 102 may transmit the received data to the remote server 106. The mobile device 102 may store the received data in the memory 1304 for a predetermined period of time after transmitting the received data to the remote server 106 (e.g., 1 month, 2 months, 4 months, 6 months, or any other suitable period of time). However, in some instances, once the received data is transmitted, the mobile device 102 may erase/delete the stored data. Additionally, or alternatively, the received data may be stored in the memory 1304 until an instruction to transmit and/or delete the received data is received by the mobile device 102. The mobile device 102 may transmit the stored data to the remote server 106 using, for example, the remote server communication interface 1308.

In some instances, the mobile device 102 may not store the received data in the memory 1304. For example, the mobile device 102 may transmit the received data directly to the remote server 106. In other words, the mobile device 102 may be an intermediary that connects the ELD dongle 104 to the remote server 106. In some instances, the mobile device 102 may store a copy of the received data in the memory 1304 and transmit the received data to the remote server 106. In other words, the mobile device 102 may be both an intermediary that connects the ELD dongle 104 to the remote server 106 and be a backup that stores a copy of the received data.

In some instances, the mobile device 102 may include an ELD application 1310 that includes one or more instructions stored in the memory 1304, that when executed by the processor 1302 cause the mobile device 102 to carry out various operations. In some instances, the ELD application 1310 may be implemented in circuitry such that the mobile device 102 carries out the one or more operations.

The ELD application 1310 may cause the mobile device 102 to generate one or more reports. For example, the mobile device 102 may generate one or more reports that are based, at least in part on, data received from the ELD dongle 104. The one or more reports may comply with one or more regulatory requirements mandated by, for example, a government entity, an industry association, a corporation, and/or any other group. For example, in the United States, the generated reports may comply with one or more regulations promulgated by the Federal Motor Carrier Safety Administration (FMCSA). Examples of regulations promulgated by the FMCSA may be found at Part 395 of the Federal Motor Carrier Safety Regulations (which may also be found at 49 C.F.R. § 395) and Part 396 of the Federal Motor Carrier Safety Regulations (which also may be found at 49 C.F.R. § 396). In some instances, the operator of the vehicle 114 may be able to select which reports to generate and which compliance regulations the generated reports should comply with. Further, in some instances, the ELD dongle 104 and/or the mobile device 102 may automatically determine which reports should be generated and which regulations should be used to generate the one or more reports based, at least in part, on a current location of the vehicle 114. In some instances, the remote server 106 may determine which reports should be generated and which regulations should be used to generate the one or more reports based, for example, at least in part, on a destination location and a departure location for the vehicle 114. For example, with respect to hours of service (HOS) logs/reports, the ELD dongle 104, the mobile device 102, and/or the remote server 106 may base the generated HOS log/report on, for example, one or more of a Canadian interpretation, a Californian interpretation, an Alaskan interpretation, an oil field interpretation, a bus, coach, and passenger carrier interpretation, and/or any other suitable interpretation. In some instances, the generated report may account for one or more exceptions to one or more of the specified requirements.

For example, the one or more reports may include any one or more of an hours of service (HOS) log/report, a driver vehicle inspection report, an International Fuel Tax Agreement (IFTA) miles report, an International Registration Plan (IRP) miles report, a record of duty (ROD) status report, an operator report, and/or any other desired report. In some instances, the ELD application 1310 may include instructions that cause the mobile device 102 to generate an operator annotated version of any one or more of the reports generated by the mobile device 102. The annotated report may be stored in the memory 1304 separately from the un-annotated report. The annotations may include, for example, manually entered corrections, comments, or any other information. Both the annotated and un-annotated reports may be capable of being transmitted to the remote server 106. In some instances, the annotated and/or un-annotated reports may be transmitted to the remote server 106 at one or more of a predetermined time (e.g., at the end of a 24 hour period), when the mobile device 102 connects to a Wi-Fi network, when the mobile device is capable of connecting to a cellular network (e.g., the vehicle 114 may travel through areas having little cellular coverage and the one or more reports may only be capable of being transmitted intermittently), and/or the like. In some instances, the annotated and/or un-annotated reports may be transmitted in real-time (e.g., as the report is being generated, the generated portions are transmitted to the remote server 106). Further, in some instances, one or more of the reports may be generated by the ELD dongle 104 and may be encrypted by the secure chip 218 before being transmitted to, for example, the mobile device 102.

One or more reports may record, for example, the elapsed time in which the vehicle 114 is in operation (e.g., drive time) and the elapsed time in which the vehicle 114 is not in operation (e.g., rest time) for a 24-hour reporting period. In some instances, one or more reports may include data relating to when the vehicle 114 is not in operation but the operator of the vehicle 114 is on-duty. On-duty time may include, for example, drive time and any other activities relating to employment (including those employment activities not related to driving). One or more reports may also include data relating to when the operator of the vehicle 114 if off-duty. Off-duty time may include those activities not relating to employment, such as rest time. At the end of the 24-hour reporting period, one or more reports may be presented to the operator of the vehicle 114 for verification/certification.

One or more reports may include one or more of the date (e.g., day, month, and year) on which one or more 24-hour reporting periods commenced, the total driving miles in a respective reporting period, vehicle identification information (e.g., license number and licensing state for each truck and/or trailer driven in the reporting period, and/or a vehicle identification number assigned to the vehicle 114), a motor carrier name, a main office address for the motor carrier, co-driver name (if applicable), the time base used (e.g., eastern standard time, pacific time, central time, etc. . . . ), driver remarks, total hours, and/or shipping document numbers or name of shipper and commodity.

One or more of the reports may be based on a vehicle operator's observation and/or examination of various aspects of the vehicle 114 before and/or after the vehicle 114 reaches a desired destination. For example, one or more of the reports may include data relating to one or more of the brakes for the vehicle 114, brakes for any trailer coupled to the vehicle 114, the parking brake for the vehicle 114, the steering mechanism for the vehicle 114, the lighting devices (e.g., headlights or taillights), any reflectors coupled to the vehicle 114, the tires, the horn, the windshield wipers, the rear vision mirrors, any coupling devices, the wheels, the rims, and/or any emergency equipment. In some instances, one or more of reports may include data relating to a trailer coupled to the vehicle 114 including, for example, data relating to trailer brakes, trailer lighting devices, trailer markers, trailer conspicuity marking materials, trailer wheels, trailer rims, trailer lugs, trailer tires, airline connections, airline hoses, airline couplers, king pin upper coupler device, rails/support frames, tie down bolsters, locking pins, devises, clamps, hooks, and/or sliders (or slider frame lock). If, during the vehicle operator's examination, the vehicle operator identifies a defect in the vehicle 114 the vehicle operator may include that defect in one or more of the reports.

The IFTA miles report may include data necessary for compliance with the International Fuel Tax Agreement. Similarly the IRP miles report may include data necessary for compliance with the International Registration Plan. In some instances, the operator of the vehicle 114 may generate a report. In some instances, the operator generated report may be a report generated solely by the operator of the vehicle 114. Additionally, or alternatively, the operator generated report may include one or more predetermined prompts for information that the operator of the vehicle 114 may choose to answer. Any of the one or more reports may include a signature of the vehicle operator certifying the accuracy of the one or more reports.

In some instances, one or more of the reports may be edited, annotated, and/or generated by a passenger in the vehicle 114. For example, when the passenger is connected to the ELD dongle 104 the passenger may edit, annotate, and/or generate one or more records while the operator of the vehicle 114 is driving the vehicle 114.

In some instances, the generated reports may be stored in the memory 1304 of the mobile device 102 and/or the memory 210 of the ELD dongle 104. The reports may be stored in the memory 1304 and/or the memory 210 for a predetermined period of time or until the reports are transmitted to the remote server 106. For example, in some instances, the generated reports may be transmitted to the remote server 106 immediately after generation and not stored in the memory 1304 and/or the memory 210. However, in some instances it may be desirable to have the memory 1304, the memory 210, and/or the remote server 106 each to store copies of the generated reports for purposes of data preservation and backup. In some instances, the memory 1304 and/or the memory 210 may not be able to store all of the generated reports indefinitely and, therefore, some reports may be erased/deleted from the memory 1304 and/or the memory 210 after a predetermined period of time. Similarly, the reports may be erased/deleted from the remote server 106 after a predetermined period of time.

In some instances, the mobile device 102 may associate each of the generated reports with an identifier associated with the operator of the vehicle 114. As discussed herein, in some instances, the ELD dongle 104 may associate the received data with an identifier associated with the operator of the vehicle 114. However, in some instances, the ELD application 1310 may be used to associate the received data and/or the reports with an identifier associated with the operator of the vehicle 114. For example, the operator of the vehicle 114 may enter login credentials into the ELD application 1310. Upon verification of the login credentials, all data received from the ELD dongle 104 may be associated with the operator of the vehicle 114 until, for example, the mobile device 102 is disconnected from the ELD dongle 104 for a predetermined period of time. In some instances, the ELD dongle 104 may transmit (e.g., automatically or in response to a request) the vehicle identification number (VIN) to the mobile device 102. The ELD application 1310 may then cause the VIN to be associated with one or more of the generated reports. In some instances, the generated reports may be associated with both the VIN and the identifier associated with the operator of the vehicle 114.

In some instances, multiple operators may use a single ELD dongle 104 and/or a single vehicle 114. In other words, multiple operators may use the same vehicle 114. Therefore, multiple operators may also use the same ELD dongle 104. As a result, the mobile device 102, the ELD dongle 104, and/or the remote server 106 may be capable of verifying the credentials of multiple operators using a single ELD dongle 104. Similarly, in some instances, multiple operators may use the same mobile device to connect to one or more ELD dongles 104. As a result, the mobile device 102, the ELD dongle 104, and/or the remote server 106 may be capable of verifying the credentials of multiple operators using a single mobile device 102.

In some instances, one or more of the reports may be presented to the operator of the vehicle 114 via a display 1312 communicatively coupled to the mobile device 102. For example, the display 1312 may be included with the mobile device 102. In some instances, the display 1312 may be capable of responding to touch inputs such that the operator of the vehicle 114 may interact with the mobile device 102 using the display 1312. In other words, the mobile device 102 may be, for example, a smartphone or a tablet computer, wherein the display 1312 is responsive to touch.

The ELD application 1310 may include one or more instructions that, when executed by the processor 1302, cause the display 1312 to generate a mobile device graphic user interface (GUI) that can be viewed and/or manipulated by the operator of the vehicle 114. In other words, the mobile device GUI may be interactive such that one or more user inputs cause the mobile device GUI to change (e.g., changing the information being displayed). FIGS. 14A-14F show example embodiments of an example the mobile device GUI.

Figure 14C:
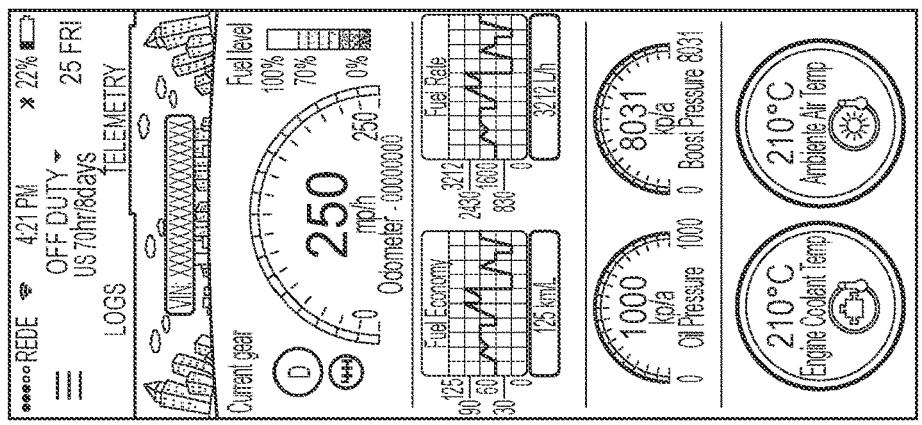
FIG. 14C is another example view of a graphical user interface for the mobile device of FIG. 1, consistent with embodiments of the present disclosure.
Figure 14B:
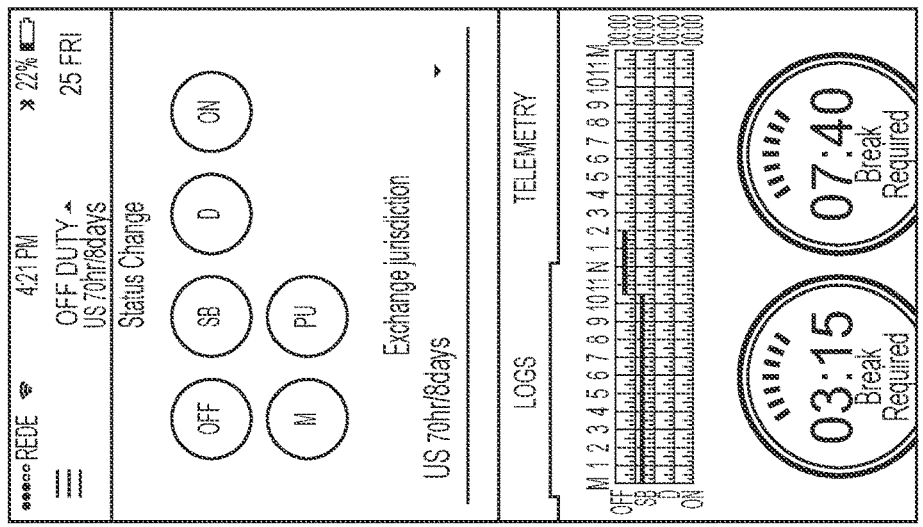
FIG. 14B is another example view of a graphical user interface for the mobile device of FIG. 1, consistent with embodiments of the present disclosure.
Figure 14A:
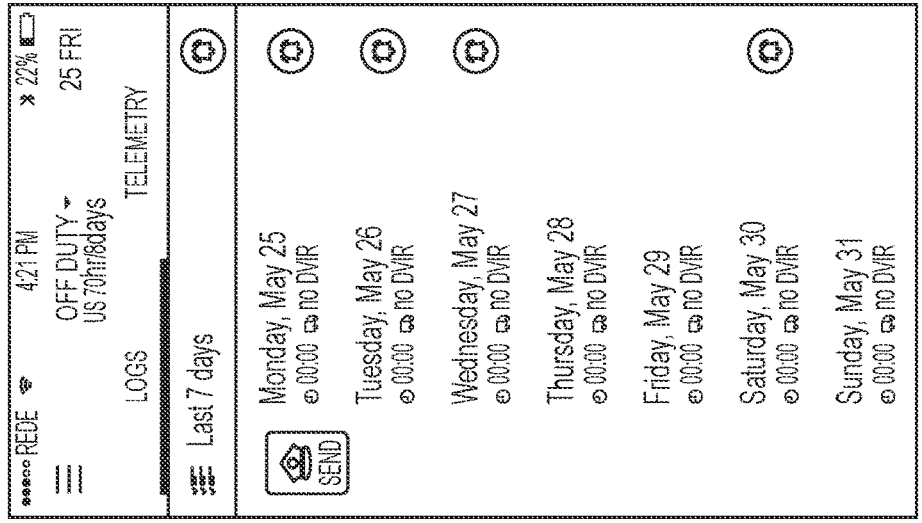
FIG. 14A is an example view of a graphical user interface for the mobile device of FIG. 1, consistent with embodiments of the present disclosure.
Figure 14F:
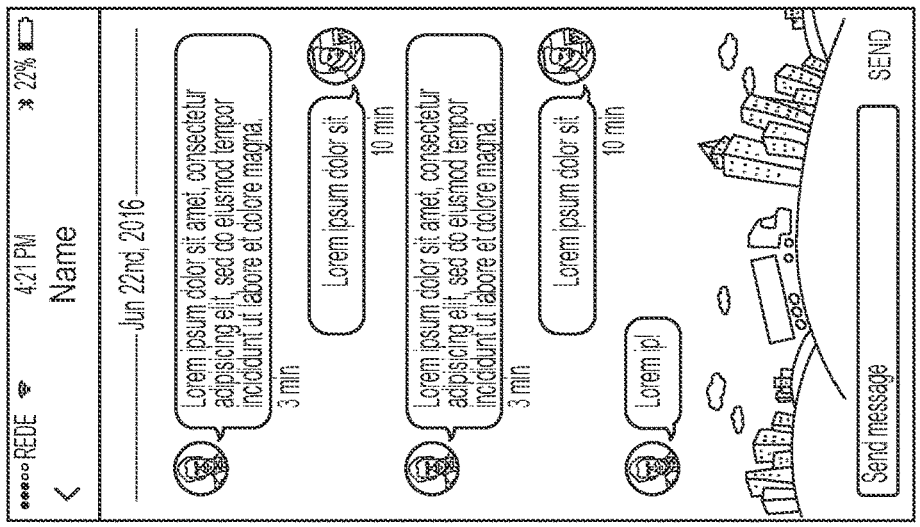
FIG. 14F is another example view of a graphical user interface for the mobile device of FIG. 1, consistent with embodiments of the present disclosure.
Figure 14E:
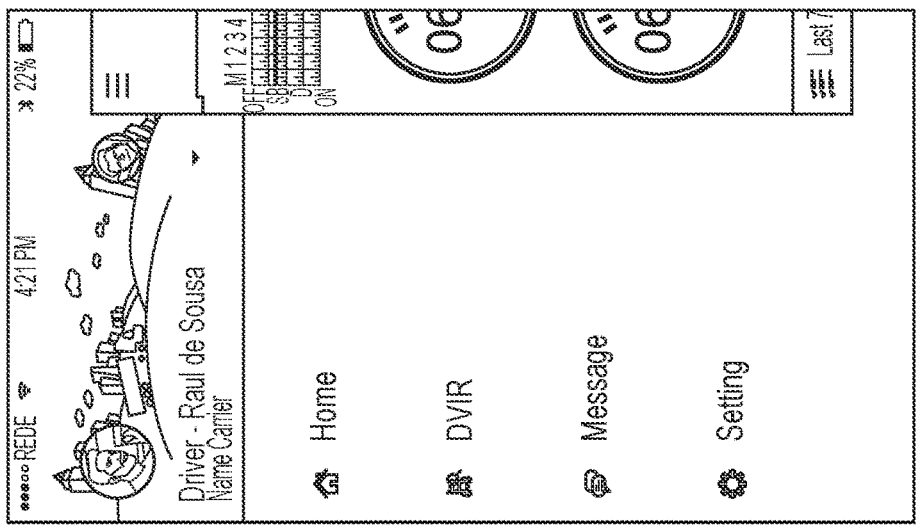
FIG. 14E is another example view of a graphical user interface for the mobile device of FIG. 1, consistent with embodiments of the present disclosure.
Figure 14D:
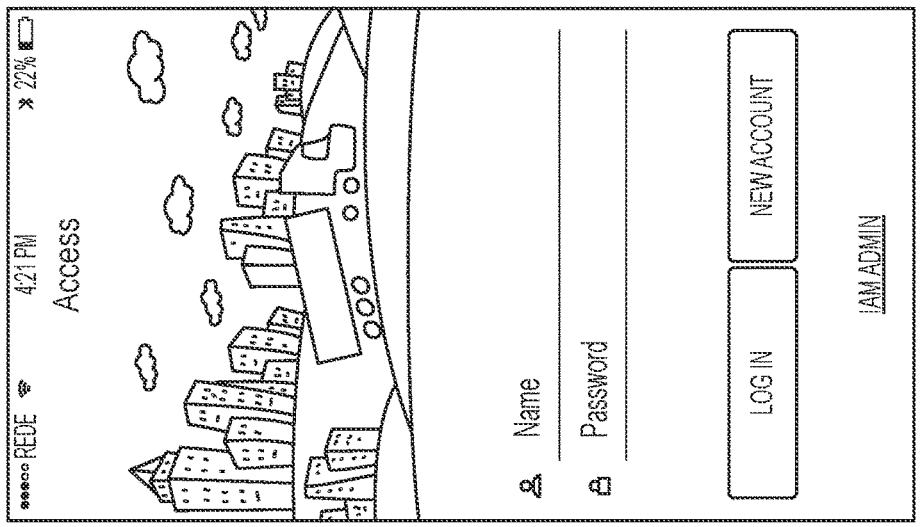
FIG. 14D is another example view of a graphical user interface for the mobile device of FIG. 1, consistent with embodiments of the present disclosure.

The mobile device GUI may, for example, present the operator of the vehicle 114 with options to view, enter, edit, and/or annotate reports (see, e.g., FIG. 14A). In some instances, the display 1312 may present data related to one or more vehicle characteristics recorded by the ELD dongle 104. In some instances, the mobile device GUI may be a graphical representation of one or more HOS logs/records (see, e.g., FIG. 14B). For example, the mobile device GUI may display the total on-duty time, total off-duty time (e.g., rest time), and/or total on-duty time remaining. Further, in some instances when, for example, the operator of the vehicle 114 exceeds that allowable total on-duty time, an alert may be generated and displayed using the mobile device GUI. In some instances, the alert may also include an audible component. The total on-duty time remaining may be based, at least in part, on a regulatory requirement that specifies, for example, total on-duty time in a 24-hour period and/or the total on duty time for an ongoing 24-hour period. In some instances, the mobile device GUI may generate one or more engine diagnostic gauges that provide digital representations (e.g., animations) of data received from the ELD dongle 104 (see, e.g., FIG. 14C). This may include, for example, a digital representation of engine speed (e.g., a tachometer), a digital representation of engine temperature, a digital representation of vehicle speed, and/or other similar data.

In some instances, the mobile device GUI may include prompts that allow the operator of the vehicle 114 to enter information to be stored in the memory 1304. The entered information may be used to generate one or more reports or to alter one or more previously generated reports. For example, the mobile device GUI may include prompts to allow the operator of the vehicle 114 to change his/her identification from vehicle operator (e.g., driver) to passenger. In some instances, the mobile device GUI may include, for example, prompts to allow an operator of the vehicle 114 to change his/her duty status between, for example, on-duty driving, on-duty not driving, and off-duty (see, e.g., FIG. 14B). The on-duty not driving status may include non-driving activities of a vehicle operator, for example, yard work and/or vehicle inspections. In some instances, the mobile device GUI may include prompts that request and/or allow an operator of the vehicle 114 to certify any generated records. Certification of the generated records may include the operator certifying that the generated records comply with legal regulations and/or corporate requirements. In some instances, the mobile device GUI may include a prompt that allows a driver to cause one or more generated records to be transmitted to a third party (e.g., a law enforcement official or a corporate officer using for example wireless connection such as Bluetooth or Wi-Fi and/or a wired connection such as USB or Ethernet). Prior to transmitting the one or more generated records to a third party, the mobile device GUI may include one or more prompts that allow the operator of the vehicle 114 to include remarks and/or annotations on the generated reports to be transmitted to the third party. Further, the mobile device GUI may allow the operator of the vehicle 114 to manually enter locations of the vehicle 114. In some instances, the mobile device GUI may include prompts that allow the operator of the vehicle 114 to select a default display language for the mobile device GUI. For example, the operator of the vehicle 114 may be able to select between at least two or more of Spanish, English, French, Portuguese, German, and/or any other language. In some instances, the mobile device GUI may include a prompt that requests the operator of the vehicle 114 to enter login credentials (see, e.g., FIG. 14D). Further, in some instances, the mobile device GUI may include a menu that presents the operator of the vehicle 114 with multiple options (see, e.g., FIG. 14E). The menu may be capable of being accessed and/or displayed at any time during the operation of the ELD application 1310. The menu may provide the operator of the vehicle 114 with a prompt to return to a predetermined display (e.g., a home screen), a prompt to review and/or create a record (e.g., a driver vehicle inspection report), an option to engage in a mobile messaging feature, and/or a settings option (e.g., to allow the operator of the vehicle 114 to change one or more functions of the ELD application 1310). In some instances, when the mobile messaging feature is accessed, the operator of the vehicle 114 may be able to communicate with, for example, his/her employer and/or other vehicle operators (see, e.g., FIG. 14F). In some instances, the messaging feature may be disabled when the vehicle 114 is in motion.

Referring again to FIG. 13, the ELD application 1310 may include one or more instructions that cause the mobile device 102 to request and/or receive a firmware update for the ELD dongle 104 from the remote server 106. In some instances, the mobile device 102 may include a separate application that causes the mobile device 102 to request and/or receive a firmware update for the ELD dongle 104 from the remote server 106. Additionally or alternatively, the firmware update may be requested from and/or received from a third party server that is different from the remote server 106. For example, the firmware update may be received from (e.g., downloaded from) a server hosting a digital distribution marketplace. The firmware update may improve the function of the ELD dongle 104 (e.g., mitigate software bugs), update/improve the encryption protocols used by the ELD dongle 104, introduce new functions and/or capabilities to the ELD dongle 104 (e.g., updating and/or adding vehicle operator behavior algorithms), and/or the like.

In some instances, the ELD application 1310 may include one or more instructions that cause the mobile device 102 to transmit or generate one or more documents. For example the mobile device 102 may include an optical sensor 1314 (e.g., a camera) capable of capturing one or more images. In some instances, the ELD application 1310 may be capable of performing optical character recognition (OCR) on images captured by the optical sensor 1314. The resulting OCR data may be used, for example, to generate combined reports that utilize both data collected using the ELD dongle 104 and non-electronic data recorded by the operator of the vehicle 114.

Further, in some instances, the operator of the vehicle 114 may generate one or more data files (e.g., text documents) that are separate from the generated reports. The one or more data files and/or any captured images may be generated independent from the ELD application 1310. However, in some instances, the one or more data files and/or captured images may be generated using the ELD application 1310. Regardless, the ELD application 1310 may cause the one or more data files and/or captured images to be transmitted to the remote server 106. In some instances, the ELD application 1310 may cause one or more data files, one or more generated reports, and/or captured images to be transmitted to another device (e.g., to a mobile device belonging to an enforcement official and/or another vehicle operator). Further, in some instances, the mobile device 102 may be able to send and receive e-mails that may include, for example, one or more generated reports, one or more data files stored on the mobile device, and/or one or more images stored on the mobile device 102 to be transmitted via email (e.g., as an attachment).

The optical sensor 1314 may, in some instances, be used to read one or more machine readable codes 1315 that are configured to be coupled to the vehicle 114. For example, the machine readable code 1315 may be a linear barcode, a matrix barcode (e.g., a Quick Response (QR) Code), and/or any other suitable visual representation of data. For example, one or more machine readable codes 1315 may be coupled to the vehicle 114 and/or the ELD dongle 104 (e.g., by using an adhesive and/or an adhesive tape). The machine readable code 1315 may, for example, represent data that may be used when connecting the mobile device 102 to the ELD dongle 104. Therefore, the mobile device 102 may connect to the ELD dongle 104 based, at least in part, on the machine readable code 1315. For example, when the ELD dongle 104 is associated with a respective vehicle 114, the machine readable code 1315 may be affixed to the vehicle 114 such that, when an operator of the vehicle 114 positions the machine readable code 1315 in view of the optical sensor 1314, the optical sensor can read the machine readable code 1315 (e.g., by scanning or capturing an image of the machine readable code 1315). The mobile device 102 may then connect to the ELD dongle 104 associated with the vehicle 114 based on the machine readable code 1315. In other words, the mobile device 102 may communicatively couple to the ELD dongle 104 in response to the mobile device 102 reading the machine readable code 1315. Therefore, the machine readable code 1315 may represent data identifying the ELD dongle 104 such that the user of the mobile device 102 is not required to manually input data necessary to connect to the ELD dongle 104. In some instances, the machine readable code 1315 may be able to be reproduced in the event of damage to the machine readable code 1315 and/or if the ELD dongle 104 is moved to a different vehicle 114. For example, the remote server 106 may include the data necessary for reproduction. Additionally, or alternatively, the mobile device 102 and/or the ELD dongle 104 may include the data necessary for reproduction.

In some instances, the machine readable code 1315 may be a non-visual representation of data. For example, the machine readable code 1315 may be a radio frequency identification (RFID) chip, a magnetic stripe capable of storing data, a near field communication (NFC) chip, and/or any other form data representation. In these instances, the mobile device 102 may include, for example, one or more of an RFID reader, a magnetic strip reader, an NFC chip, and/or any other reader capable of reading the machine readable code 1315.

As discussed herein, the ELD dongle 104 may include the GPS receiver 212. However, in some instances, the mobile device 102 may also include a GPS receiver 1316. The GPS receiver 1316 may be used instead of or in addition to the GPS receiver 212 in the ELD dongle 104. Therefore, in some instances, the ELD dongle 104 may not include the GPS receiver 212. Regardless, the GPS receiver 212 and/or the GPS receiver 1316 may be used to determine a location of the vehicle 114. The location of the vehicle 114 may be included in the one or more generated reports and/or associated with the one or more generated reports.

The mobile device 102 may transmit to, for example, remote server 106 the data received from the ELD dongle 104, one or more of the generated reports, any operator generated data, files stored in the mobile device (including images and text documents), and/or other similar data structures accessible to the mobile device 102. In some instances, the mobile device 102 may transmit the data received from the ELD dongle 104, one or more of the generated reports, any operator generated data, files saved in the mobile device (including images and text documents), and/or other similar data structures accessible to the mobile device 102 to a printing device 1318 (e.g., an ink jet printer, a laser jet printer, a thermal printer, and the like). The printing device 1318 may be communicatively coupled to the mobile device 102 using a wired connection (e.g., Universal Serial Bus, Ethernet, and/or any suitable wired connection) and/or wireless connection (e.g., Bluetooth, Wi-Fi, and/or any suitable wireless connection). For example, in some instances, the printing device 1318 may be communicatively coupled to the mobile device 102 using, for example, the dongle communication interface 1306. In other words, the printing device 1318 and the ELD dongle 104 may each communicate with the mobile device 102 using the same communication circuitry. The printing device 1318 may generate (e.g., print) physical versions of, for example, the one or more generated reports for presentation to, for example, law enforcement officials. In some instances, the mobile device 102 may transmit data including, one or more of the generated records, to one or more enforcement officials using a wired and/or wireless connection. In these instances, the enforcement official may print physical copies of the received data or view digital copies of the received data on a digital device (e.g., a computer, a tablet computer, a smartphone, and the like).

Figure 15:
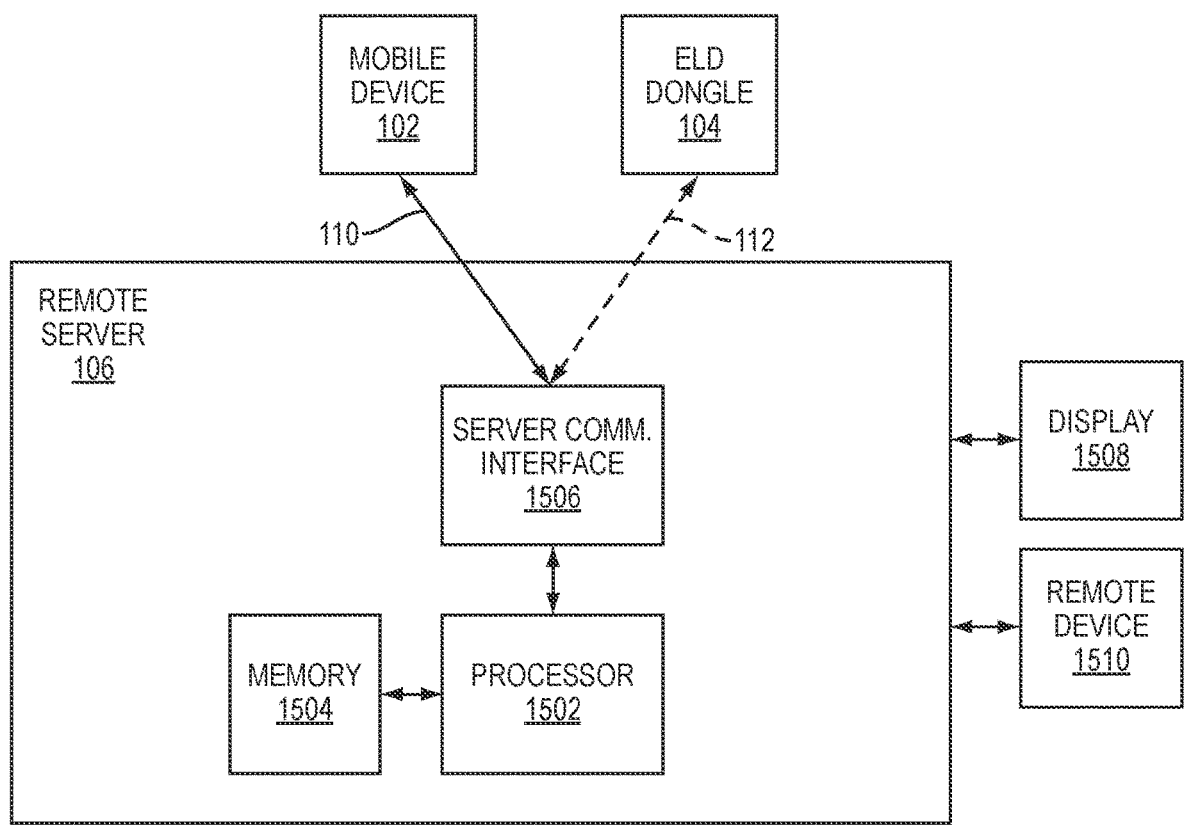
FIG. 15 is a schematic example of a remote server communicatively coupled to the ELD system of FIG. 1, consistent with embodiments of the present disclosure.

FIG. 15 shows an example of an embodiment of the remote server 106 of FIG. 1. As shown, the remote server 106 may include a processor 1502, memory 1504, and a server communication interface 1506. The server communication interface 1506 may be communicatively coupled to the mobile device 102 using, for example, the second data connection 110 and/or the ELD dongle 104 using the third data connection 112. Therefore, the server communication interface 1506 may be compatible with a cellular connection (e.g., GSM, UMTS, LTE, or any other suitable cellular connection), Bluetooth, (including low energy Bluetooth), Wi-Fi, Universal Serial Bus, Ethernet, and/or other suitable communication standards.

The remote server 106 may receive, periodically (e.g., at predetermined times, when the mobile device 102 is connected to Wi-Fi, when the mobile device 102 is capable of connecting to a cellular network, or the like) or in real-time, one or more reports generated by the mobile device 102, data generated by the operator of the vehicle 114, data received by the mobile device 102 from the ELD dongle 104, a location of the mobile device 102 and/or ELD dongle 104, login credentials for an operator and/or passenger of the vehicle 114, messages from an operator and/or passenger of the vehicle 114, and/or any other data generated, stored, or received by the mobile device 102. In some instances, the remote server 106 may receive some or all of the data from the ELD dongle 104.

The memory 1504 may include instructions stored thereon, which when executed by the processor 1502, cause the remote server 106 to carry out one or more operations. For example, the instructions may cause the remote server 106 to generate a server GUI using a display 1508. The server GUI may be interactive such that one or more user inputs cause the server GUI to change (e.g., changing the information being displayed). Additionally, or alternatively, the server GUI may be generated by a remote device 1510 (e.g., a remote computer, mobile device, and/or any other suitable device). In these instances, the remote server 106 may not generate the server GUI. Instead, the remote server 106 may be capable of communication with the remote device 1510 and the remote device 1510 may generate the server GUI. The communication between the remote device 1510 and the remote server 106 may be over a network (e.g., the internet, a local area network, or any other suitable network).

For example, the server GUI may display a real-time location of the vehicle 114 using positional data generated by the GPS receiver 212 of the ELD dongle 104 and/or the GPS receiver 1316 of the mobile device 102. The real-time location data may be plotted on a map generated by the server GUI. The server GUI may also display previous locations on the generated map such that the route taken by the vehicle 114 may be tracked. Therefore, in some instances, the server GUI may provide one or more dispatching functions. For example, the server GUI may present information relating to a schedule and whether or not a respective vehicle operator is meeting the presented schedule (e.g., whether or not the vehicle 114 is anticipated to arrive at its destination on time). By way of further example, in some instances, the dispatching functions may include rerouting one or more vehicles 114 by transmitting updated routing instructions to, for example, a respective mobile device 102.

In some instances, the remote server 106 may transmit vehicle locations to a third party. For example, when the vehicle 114 reaches predetermined locations, the remote server 106 may cause a short messaging service (SMS) text message to be sent to a device belonging to a third party (e.g., a smartphone, a pager, a tablet computer, a desktop computer, a laptop computer, and the like).

In some instances, the GUI may be capable of displaying the prior positions of the vehicle 114 for a predetermined period of time. For example, the GUI may be capable of displaying positions of the vehicle 114 for the prior thirty days. In these instances, the locations may be plotted on a map. Additionally, or alternatively, the locations may be included within a chart. For example, the chart may include map coordinates (e.g., latitude and longitude) and/or nearby places of interest (e.g., a city/town, an address, a business, or other suitable places interest).

In some instances, the remote server 106 may generate a route for the operator of the vehicle 114 to take based, at least in part, on a current position of the vehicle 114 and a desired destination for the vehicle 114. The route may be transmitted to the mobile device 102 such that the operator of the vehicle 114 may follow the generated route. The generated route may be updated periodically or continuously based on a current position of the vehicle 114. In some instances, the route may be changed based on the vehicle 114 not continuing follow the route.

The remote server 106 may include one or more waypoints/checkpoints in the generated route. In some instances, at least one of the waypoints/checkpoints may be included and/or changed by a user of the remote server 106 via the server GUI. The waypoints/checkpoints may be used to track the progress of the vehicle 114 as the vehicle 114 traverses the generated route. The waypoints/checkpoints may also be used to determine when the vehicle 114 reaches a destination. For example, when the vehicle 114 reaches a waypoint/checkpoint located at a destination location, it may be indicative of a successful delivery (when the vehicle 114 is a delivery vehicle).

In some instances, a geo-fence (e.g., a polygonal geo-fence) may be generated by the remote server 106 and/or a user of the remote server 106 via the server GUI. The geo-fence may define a geographic region in which the vehicle 114 is permitted to operate. When the vehicle 114 exits the geographic region defined by the geo-fence, the remote server 106 may cause an alert to be generated. The alert may be displayed on the server GUI and/or may be transmitted to a third party device (e.g., a third party computer, mobile device, or any other suitable third part device).

In some instances, the remote server 106 is capable of executing one or more macros. The one or more macros may be predefined, user defined, and/or adjustable. The one or more macros may cause the remote server 106 to execute one or more instructions that cause the remote server 106 to carry out one or more operations. In some instances, a single macro may cause the remote server 106 to execute at least two instructions and/or carry out at least two operations. For example, a macro may be executed in response to the vehicle 114 reaching a waypoint/checkpoint. The execution of the macro may result in, for example, the geo-fence being updated, the route being updated, and/or a notification being sent to a third party regarding the present location of the vehicle 114. By way of further example, one or more macros may be used to request that the mobile device 102 generate and/or transmit one or more reports (e.g., an HOS report/log) and/or data received/stored by the mobile device 102. In this instance, for example, after a predetermined period of time (e.g., 24 hours) one or more macros may execute that cause the mobile device 102 to generate and transmit one or more reports and/or data received/stored by the mobile device 102. In other words, one or more macros may be used to automate various features capable of being performed by any one or more of the mobile device 102, the ELD dongle 104, and/or the remote server 106.

In some instances, the macros may generally be described as being one or more security rules to generate, for example, one or more alerts or notifications. The security rules may be predefined, user defined, and/or user adjustable. For example, in some instances, one or more security rules may be deactivated and/or activated using the server GUI. By way of further example, in some instances new security rules may be added and/or existing security rules may be modified or deleted. As a result, the security rules may be changed and/or adapted based on the needs of a given scenario.

In some instances, the security rules may correspond to one or more rules that are triggered in response to data received from, for example, the mobile device 102 regarding the vehicle 114. For example, a security rule may be triggered in response to determining that the vehicle 114 crossed a geo-fence and/or in response to determining a location of the vehicle 114. By way of further example, the security rule may be triggered based on data received from the mobile device that indicates a condition of the vehicle 114 (e.g., an instance of speeding, an instance of rapid deceleration, and/or the like). When a security rule is triggered, the remote server 106 may, for example, transmit an alert (e.g., an SMS message) to the driver of the vehicle 114, a third party, and/or a user of the remote server 106 (e.g., administrative personnel). In some instances, when a security rule is triggered, the remote server 106 may transmit a command to the vehicle 114. The command may cause the vehicle 114 to lock/unlock its doors, engage its directional signals, disable/enable its engine, and/or the like. For example, when the vehicle 114 is determined to be located at a specific location and/or to be entering a specific region a security rule may be triggered causing a command to be sent to the vehicle 114 to cause the vehicle 114 to lock its doors and the triggering of the security rule may also cause an alert to the driver of the vehicle 114, a third party, and/or a user of the remote server 106 (e.g., administrative personnel).

In some instances, the remote server 106 may facilitate text based, video based, and/or audio based communications between the operator of the vehicle 114 and a third party. For example, the remote server 106 may facilitate communications between multiple vehicle operators connected to the remote server 106. Additionally, or alternatively, the remote server 106 may facilitate communications between one or more vehicle operators and a non-driving third party (e.g., an employer, administrator, and/or any other non-driving third party). The communications may be initiated using, for example, one or more of the mobile device GUI and/or the server GUI. For example, the operator of the vehicle 114 may, using the mobile device GUI, compose a text based message. Upon completion of the text based message, the operator of the vehicle 114 may cause the mobile device 102 to transmit the text based message to the remote server 106. The text based message may then be presented using the server GUI and a response to the text based message may then be sent using the server GUI. Additionally, or alternatively, when the text based message is received by the remote server 106, the remote server 106 may cause an SMS text message to be generated and transmitted to a third party mobile device. The third party mobile device may then respond to the SMS message using an SMS message. As a result, the third party may respond to the text based message without accessing the server GUI. Further, in some instances, for example, when the remote server 106 receives a text based message from the mobile device 102, the remote server 106 may forward the text based message to another mobile device 102 communicatively coupled to the remote server 106. In other words, the remote server 106 may facilitate communications between operators of vehicles 114.

In some instances, multiple individuals may have access to the remote server 106. For example, the operator of the vehicle 114 may have access to the remote server 106 using the mobile device GUI. In these situations, the operator of the vehicle 114 may be granted access to the remote server 106 only if the operator's login credentials are verified. However, the operator of the vehicle 114 may only be able to access limited amounts of data stored on the remote server 106. For example, the operator of the vehicle 114 may only be able access data originating from his/her mobile device 102 and/or ELD dongle 104. Further, the operator of the vehicle 114 may not be able to alter data stored on the remote server 106. In other words, the operator of the vehicle 114 may only have read permissions. In some instances, the login credentials for the operator of the vehicle 114 may, at least initially, be stored only on the remote server 106. For example, after the creation of an operator's account, when an operator attempts to use his/her login credentials for the first time, the login credentials may be downloaded to the mobile device 102 and/or the ELD dongle 104. Therefore, subsequent login attempts may not require access to the remote server 106.

Further, administrative personnel (e.g., the employer) may also have access to the remote server 106. The administrative personnel may be able to access data originating from multiple and/or every mobile device 102 and/or ELD dongle 104 communicatively coupled to the remote server 106. In other words, the administrative personnel may have access to data originating from multiple vehicles 114. Further, the administrative personnel may be able to read, alter, and/or delete data stored on the remote server 106. In other words, the administrative personnel may have read and write permissions. Further, administrative personnel may be able to create additional accounts (e.g., when new operators are employed), delete accounts (e.g., when operators are no longer employed), change account permissions (e.g., when an employee is promoted), and/or perform other desired account administration functions. When a new account for a vehicle operator is created, the remote server 106 may transmit the new account information to, for example, the mobile device 102 and/or the ELD dongle 104. The mobile device 102 and/or ELD dongle 104 may then associate data (including, for example, generated reports) with the newly created account.

In some instances, the remote server 106 may receive data relating to the vehicle 114. For example, the data may include one of more of speed data, ignition status data, odometer data, engine speed data, acceleration data, brake data, clutch data, and/or any other data related to the vehicle 114. The data may be generated by, for example, by the electronic control unit 118, sensors included within the ELD dongle 104 (e.g., the accelerometer 217), and/or sensors included within the mobile device 102.

The data relating to the vehicle 114 may be used to, for example, analyze and/or visualize driver performance. The brake data may be used to determine if the operator of the vehicle 114 improperly uses the brakes for the vehicle 114 (e.g., the operator of the vehicle 114 engages the brakes for prolonged periods). The brake data may also be used to determine if there was a sudden application of the brakes. The clutch data may be used to determine if the operator of the vehicle 114 improperly uses the clutch (e.g., the operator of the vehicle 114 uses the clutch to slow the vehicle 114 instead of the brakes). The acceleration data may be used, for example, to determine instances of sudden acceleration and/or deceleration. The speed data may be used to determine instances of speeding.

In some instances, the data relating to the vehicle 114 may be visualized using one or more graphs or charts. For example, the server GUI may display one or more of an acceleration chart, a braking chart, a clutch usage chart, a speed chart, a mileage chart, an engine speed chart, and/or any other chart based on any combination of available data. In some instances, the data may be visualized by providing an operator performance rating. The operator performance rating may be visualized as a number, a letter, a color, and/or a combination thereof. The operator performance rating may be based on, for example, any combination of speed data, ignition status data, odometer data, engine speed data, acceleration data, brake data, clutch data, and/or any other data related to the vehicle 114. In some instances, the operator performance rating may be used to calculate an operator performance ranking. The operator performance ranking may be representative of a comparison between two or more operators of one or more vehicles 114. For example, if a first operator has a higher operator performance rating than a second operator, the first operator may have a higher operator performance ranking. The operator performance ranking may be visualized as a number, a letter, a color, and/or a combination thereof.

The data relating to the vehicle 114 may also be used to, for example, determine a performance of the vehicle 114. For example, the data relating to the vehicle 114 may be used to determine the gas mileage of the vehicle (e.g., in miles per gallon). The data relating to the vehicle 114 may also include one or more error codes generated by the electronic control unit 118. In other words, the mechanical status of the vehicle 114 may be monitored and tracked using the remote server 106. This data may then be displayed using, for example, the server GUI. Similar data may also be capable of being displayed and/or analyzed using the mobile device 102 using, for example, the mobile device GUI.

The remote server 106 may receive and/or generate one or more reports. In some instances, the remote server 106 may generate a report based on positional data received from one or more ELD dongles 104. The positional data may be used to track the present and/or past position(s) of the vehicle 114. For example, positional data may be provided for two or more vehicles 114. In these instances, the positional data for each of the vehicles 114 may be represented on a single map.

The remote server 106 may receive an HOS report/log from the mobile device 102. The HOS report/log may be accessible from the server GUI. In other words, the server GUI may be used to manage one or more HOS reports/logs. For example, the server GUI may be used to edit, display, copy, delete/erase, annotate, and/or otherwise manage the HOS report/log. In some instances, the remote server 106 may generate the HOS report/log based on data received from one or more of the ELD dongle 104 and/or the mobile device 102. In these situations, the remote server 106 may transmit the generated HOS report/log to the mobile device 102 such that the operator of the vehicle 114 associated with the HOS report/log can certify the accuracy of the HOS report/log.

Regardless of the source of the HOS report/logs, the remote server 106 may categorize and store the HOS report/log such that the HOS report/log can be accessed from the server GUI. For example, the remote server 106 may, for example, store each HOS report/log by operator, by vehicle, and/or by date of generation. Therefore, the server GUI may present one or more options and/or prompts that allow a user of the server GUI to sort and/or categorize HOS reports/logs to facilitate easier viewing.

Further, the remote server 106 may receive and/or generate one or more additional reports/logs, some examples of which are discussed herein. The server GUI may provide similar functionality for the viewing and manipulation of the additional logs as is provided for the HOS logs/reports. Accordingly, further discussion is omitted for the sake of brevity.

In some instances, the server GUI may be capable of displaying a summary of one or more reports that have been received by the remote server 106 over a predetermined period of time. For example, the server GUI may display reports related to one or more drivers for the previous five days, previous week, previous month, previous fiscal quarter, and/or any other suitable period time.

The remote server 106 may also receive and/or generate, for each operator operating at least one of the vehicles 114, total on-duty time and/or total on-duty time remaining. The total on-duty time remaining may be determined based, at least in part, on legal regulations. The total on-duty time and/or total on-duty time remaining may be displayed on the server GUI for each operator. In some instances, the remote server 106 may receive data indicating that one or more operators are off-duty. Based on this data the remote server 106 may determine the total off-duty time. In some instances, the remote server 106 may receive data indicating the total off-duty time from, for example, the mobile device 102. The on-duty and off-duty data may be used to display one or more indicators identifying a status of one or more operators. For example, an operator that is on-duty and driving may have a first indicator associated with him/her, an operator that is on-duty and not driving may have a second indicator associated with him/her, and/or an operator who is off duty may have a third indicator associated with him/her. The first, second, and third indicators may all be different from each other. The first, second, and third indicators may be displayed proximate to, for example, an operator's identifier in the server GUI. For example, the first indicator may be a green colored indicator, the second indicator may be a yellow colored indicator, and the third indicator may be a red colored indicator.

The server GUI may also be capable of generating and/or displaying a summary of all or a portion of all of the mobile devices 102 and/or ELD dongles 104 corresponding to a respective operator connected to the remote server 106. For example, the summary may display one or more alerts. For example, when one or more operators of one or more vehicles 114 miss one or more waypoints/checkpoints, leave an area defined by a geo-fence, and/or engage in undesirable driving behavior (e.g., turning the ignition off for the vehicle 114 while the vehicle 114 is still in motion, exceeding a predefined speed limit, and/or the like), the server GUI may display one or more alerts. In some instances, the remote server 106 may cause the one or more alerts to be transmitted to a third party using, for example, an SMS message.

In some instances, the remote server 106 may be capable of sending an update and/or one or more configuration changes to one or more ELD dongles 104 and/or mobile devices 102. In other words, the remote server 106 may configure the devices communicatively coupled to the remote server 106. This may allow for an entire fleet of ELD dongles 104 and/or mobile devices 102 to have the same or substantially same settings and/or configurations. For example, the remote server 106 may be used to determine the settings to be used by each of the ELD dongles 104 and/or mobile devices 102 in the ELD system 100 for generating one or more reports.

In some instances, the remote server 106 may include one or more application program interfaces (APIs). The one or more APIs may allow for one or more server GUIs to be developed such that the server GUI may be tailored to meet specific needs. In some instances, the remote server 106 may be used by multiple fleet operators and/or carriers. In other words, the remote server 106 may function as cloud storage for information/data (including one or more reports) received from one or more mobile devices 102 and/or ELD dongles 104. As such, there may be multiple server GUIs each capable of displaying data related to one or more vehicles 114 belonging a respective fleet operator's and/or carrier's fleet. Therefore, in some instances, the remote server 106 may include one or more access restrictions to prevent fleet operators/carriers from accessing data relating to another fleet operator's/carrier's fleet.

Figure 16:
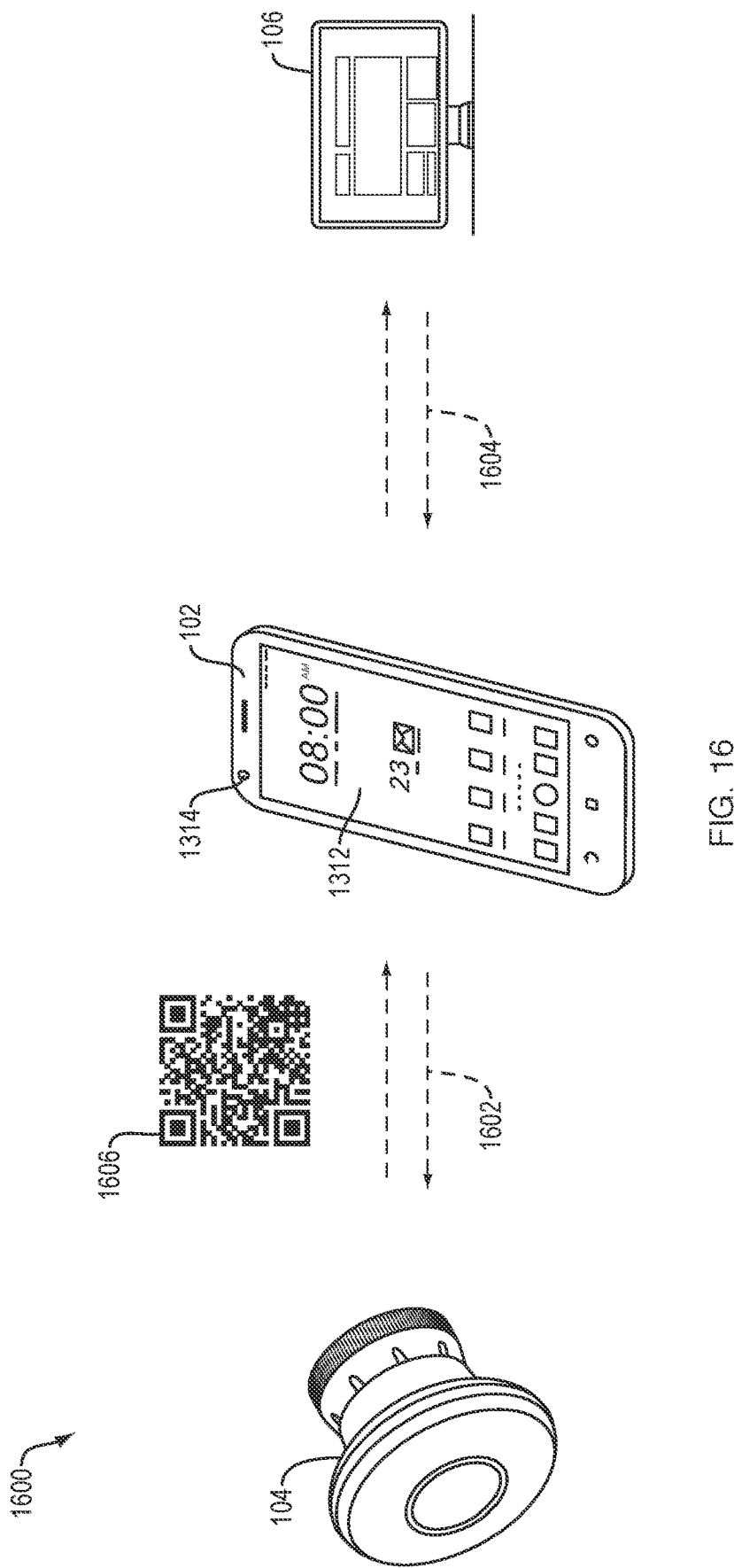
FIG. 16 is an example of the ELD system of FIG. 1, consistent with embodiments of the present disclosure.

FIG. 16 shows an example ELD system 1600, which may be an example of the ELD system 100. As shown, the ELD system 1600 includes the ELD dongle 104, the mobile device 102, and the remote server 106. The ELD dongle 104 is shown as being communicatively coupled to the mobile device 102 through a short range wireless connection 1602 (e.g., a Bluetooth connection). The mobile device 102, which may be, for example, a mobile phone, is shown as being communicatively coupled to the remote server 106 through a long range wireless connection 1604 (e.g., a cellular connection). Vehicle data (e.g., data received via the diagnostics port 116 of the vehicle 114) and/or data gathered by one or more sensors of the ELD dongle 104 may be transmitted from the ELD dongle 104 via the short range wireless connection 1602 to the mobile device 102. The mobile device 102 may then transmit the received data to the remote server 106 via the long range wireless connection 1604.

When the ELD dongle 104 receives the vehicle data via the diagnostics port 116 of the vehicle 114, the vehicle data may be in a format that is unusable by the mobile device 102 and/or the remote server 106. In this instance, the ELD dongle 104 may convert the vehicle data into a format capable of being used by the mobile device 102. Alternatively, the vehicle data may be converted into a format usable by the mobile device 102 and/or the remote server 106 by the mobile device 102 and/or the remote server 106.

The ELD dongle 104 includes the secure chip 218 and the memory 210. The memory 210 may include, for example, one or more copies of previously received vehicle data, data gathered by one or more sensors of the ELD dongle 104, operator information (e.g., login information), reports generated using the vehicle data, and/or the like. The secure chip 218 encrypts the memory 210 using a first encryption key and encrypts the data to be transmitted to the mobile device 102 using a second encryption key, the first encryption key being different from the second encryption key. As a result, when data is transmitted to the mobile device 102 the data is encrypted. Such a configuration may prevent tampering with, for example, the vehicle data during transmission to the mobile device 102.

In some instances, the secure chip 218 is used to verify a firmware update for the ELD dongle 104. The secure chip 218 may verify a firmware update based on a hash value. For example, a keyed-hash message authentication code (HMAC) may be used when verifying the authenticity of a firmware update received by the ELD dongle 104. The HMAC may be an HMAC secure hash algorithm-256 (SHA-256), HMAC SHA-1, HMAC MD-5, and/or the like.

As previously discussed, the mobile device 102 is communicatively coupled to the ELD dongle 104 via the short range wireless connection 1602. The mobile device 102 may establish the short range wireless connection 1602 in response to a machine readable code 1606 (e.g., a QR Code), which may be one example of the machine readable code 1315 of FIG. 13, being positioned within a field of view of the optical sensor 1314 of the mobile device 102. In other words, the mobile device 102 may establish a connection with the ELD dongle 104 based, at least in part, on reading the machine readable code 1606. When the short range wireless connection 1602 is a Bluetooth connection, the machine readable code 1606 may represent, for example, a passkey for establishing the Bluetooth connection, an identifier (e.g., an address) for the ELD dongle 104, and/or any other data related to establishing a connection to the ELD dongle 104.

The mobile device 102 includes the memory 1304. The memory 1304 includes a decryption key for decrypting the encrypted data received from the ELD dongle 104 and an encryption key for encrypting the memory 1304. The decryption and encryption keys may be protected in the memory 1304 using code obfuscation. Code obfuscation may prevent third parties from obtaining the decryption and encryption keys. Code obfuscation may also be used to protect one or more programs running on the mobile device 102 from reverse engineering.

When the mobile device 102 receives the encrypted data, the mobile device 102 decrypts the data. The mobile device 102 may generate one or more reports (e.g., HOS logs) based, at least in part, on the decrypted data. The reports generated by the mobile device 102 can be reviewed and/or modified by an operator of the vehicle 114 using the mobile device 102. The mobile device 102 includes the display 1312 such that, for example, one or more of the reports generated by the mobile device 102 can be presented on the display 1312. As a result, an operator of the vehicle 114 can readily review and/or modify one or more reports generated by the mobile device 102. In some instances, the mobile device 102 may store multiple reports in the memory 1304 such that an operator may be able to review and/or modify previously generated reports. For example, the memory 1304 may include reports corresponding to the previous 5 days, the previous 7 days, the previous 10 days, the previous 15 days, the previous 30 days, the previous 6 months, the previous year, and/or any other suitable period of time.

The mobile device 102 may transmit the decrypted data to the remote server 106. In some instances, the decrypted data may be re-encrypted before the mobile device 102 transmits the data to the remote server 106. For example, the data may be transmitted pursuant to the hypertext transfer protocol secure (HTTPS). Alternatively, the mobile device 102 may not decrypt the data prior to transmitting the data to the remote server 106. For example, the mobile device 102 may only decrypt the data after transmitting the encrypted data to the remote server 106.

When the data is received by the remote server 106 (e.g., from the mobile device 102), the remote server 106 may generate one or more reports (e.g., HOS logs) based, at least in part, on the received data. For example, each of the reports capable of being generated on the mobile device 102 may additionally (or alternatively) be generated on the remote server 106. In some instances, the remote server 106 may generate one or more duplicate reports to serve as a backup for reports generated at the mobile device 102. Additionally or alternatively, the remote server 106 may generate one or more reports that are not generated at the mobile device 102. For example, the remote server 106 may be capable of generating one or more reports summarizing a driver's performance to be used by administrative personnel. By way of further example, the remote server 106 may generate one or more reports summarizing driver violations (e.g., instances of speeding, instances of exceeding total allowable drive time, instances of hard breaking, and/or the like).

In some instances, the mobile device 102 may send a request/demand to the remote server 106 that causes the remote server 106 to transmit one or more reports stored at the remote server 106. For example, the mobile device 102 may transmit a demand to the remote server 106 to transmit a report currently not available on the mobile device 102. Such a demand may be sent in response to, for example, the mobile device 102 failing and/or being upgraded/replaced (resulting in a deletion of reports stored on the mobile device 102). As a result, the mobile device 102 may be able to restore/recover reports lost due to a failure. When a demand is received, the remote server 106 may transmit the report using, for example, e-mail, a webserver, and/or any other suitable form of file transmission.

Figure 17:
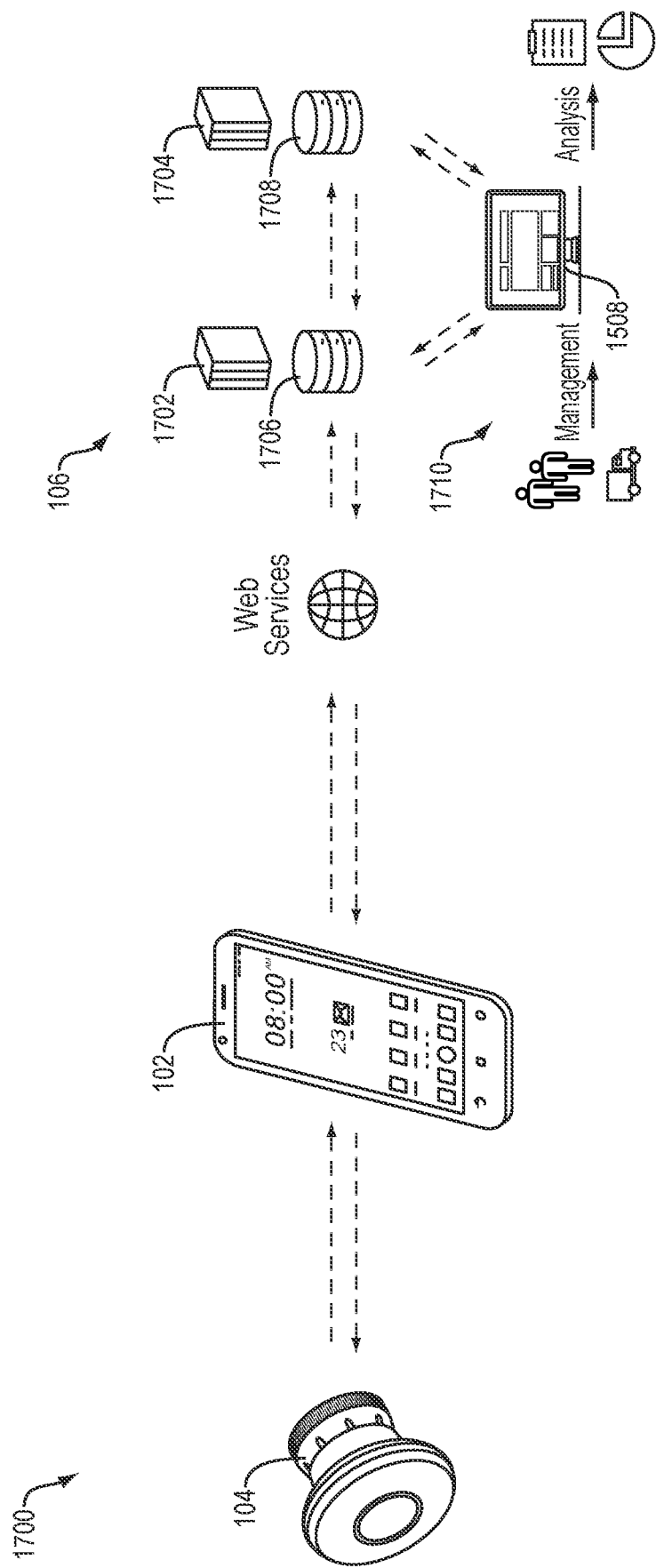
FIG. 17 is another example of the ELD system of FIG. 1, consistent with embodiments of the present disclosure.

FIG. 17 shows an example ELD system 1700, which may be an example of the ELD system 100. As shown, the ELD system 1700 includes the mobile device 102 communicatively coupled to the ELD dongle 104 and the remote server 106. As shown, the remote server 106 includes a tracking gateway server 1702 and an hours of service server 1704. The tracking gateway server 1702 includes memory 1706. The memory 1706 may include tracking data that corresponds to a location of the vehicle 114 (e.g., both present and previous locations). The memory 1706 may also security rules that are triggered, for example, based on vehicle condition and/or location. The memory 1706 may still further include telemetry data related to the vehicle 114 (e.g., vehicle data). The memory 1706 may also include commands (e.g., one or more instructions that manipulate the vehicle 114). For example, the commands may cause the cause the vehicle 114 to lock its doors, engage its directional indicators, disable its engine, and/or the like. The memory 1706 may also include any other data. As shown, the hours of service server 1704 includes memory 1708. The memory 1708 may include data related to hours of service logs and data for various vehicle operators, information pertaining to one or more vehicle drivers (e.g., name, driver's license number, fleets with which the driver is associated, and/or the like), and/or any other data.

As also shown, the tracking gateway server 1702 and the hours of service server 1704 are communicatively coupled to, for example, a terminal 1710 (e.g., a desktop computer, a laptop computer, a smartphone, a tablet, and/or the like) having the display 1508 for presenting the server GUI. In some instances, the terminal 1710 may be coupled to the tracking gateway server 1702 and the hours of service server 1704 using a network (e.g., the internet). The terminal 1710 may allow administrative personnel to review one or more reports/data, cause one or more reports to be transmitted to, for example, the mobile device 102, cause one or more reports to be generated, and/or any other review, transmission, and/or analysis procedure.

Figure 18:
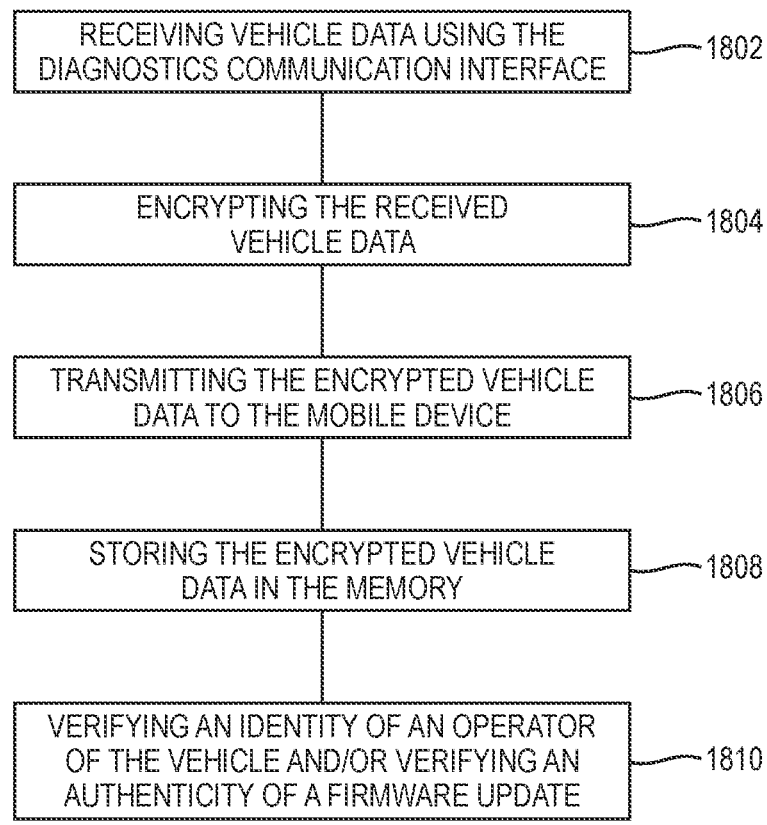
FIG. 18 is an example of operations that may be carried out by the ELD dongle of FIG. 2, consistent with embodiments of the present disclosure.

FIG. 18 shows one example of instructions that may be stored in the memory 210 of the ELD dongle 104. For example, the memory 210 may include one or more instructions causing the ELD dongle 104 to carry out operation 1802. The operation 1802 may include receiving vehicle data using the diagnostics communication interface 204, wherein the diagnostics communication interface 204 may be communicatively coupled to the diagnostics port 116 of the vehicle 114. Additionally, or alternatively, the memory 210 may include one or more instructions causing the ELD dongle 104 to carry out operation 1804. The operation 1804 may include encrypting the received vehicle data from the vehicle 114 using the secure chip 218. Additionally, or alternatively, the memory 210 may include one or more instructions causing the ELD dongle 104 to carry out operation 1806. The operation 1806 may include transmitting the encrypted vehicle data to the mobile device 102. Additionally, or alternatively, the memory 210 may include one or more instructions causing the ELD dongle 104 to carry out operation 1808. The operation 1808 may include storing the encrypted vehicle data in the memory 210. Additionally, or alternatively, the memory 210 may include one or more instructions causing the ELD dongle 104 to carry out an operation 1810. The operation 1810 may include at least one of verifying an identity of an operator of the vehicle and/or verifying an authenticity of a firmware update. The memory 210 may include any one or more of the above instructions and/or may include additional instructions, consistent with the present disclosure. Further, the ELD dongle 104 may carry out the operations in any suitable order.

Figure 19:
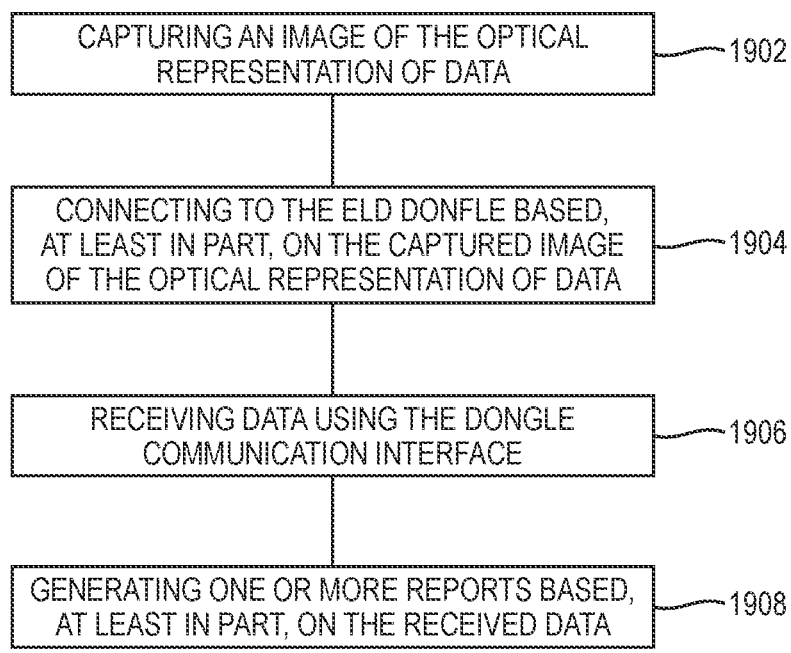
FIG. 19 is an example of operations that may be carried out by the mobile device of FIG. 13, consistent with embodiments of the present disclosure.

FIG. 19 shows one example of instructions that may be stored in the memory 1304 of the mobile device 102. For example, the memory 1304 may include one or more instructions causing the mobile device 102 to carry out an operation 1902. The operation 1902 may include reading the machine readable code coupled to the vehicle 114 using the optical sensor 1314. Additionally, or alternatively, the memory 1304 may include one or more instructions causing the mobile device 102 to carry out an operation 1904. The operation 1904 may include connecting to the ELD dongle 104 based, at least in part, on the machine readable code. Additionally, or alternatively, the memory 1304 may include one or more instructions causing the mobile device 102 to carry out an operation 1906. The operation 1906 may include receiving data using the dongle communication interface 1306, the dongle communication interface 1306 being communicatively coupled to the ELD dongle 104. Additionally, or alternatively, the memory 1304 may include one or more instructions causing the mobile device 102 to carry out an operation 1908. The operation 1908 may include generating one or more reports based, at least in part, on the received data. The memory 1304 may include any one or more of the above instructions and/or may include additional instructions, consistent with the present disclosure. Further, the mobile device 102 may carry out the operations in any suitable order.

Figure 20:
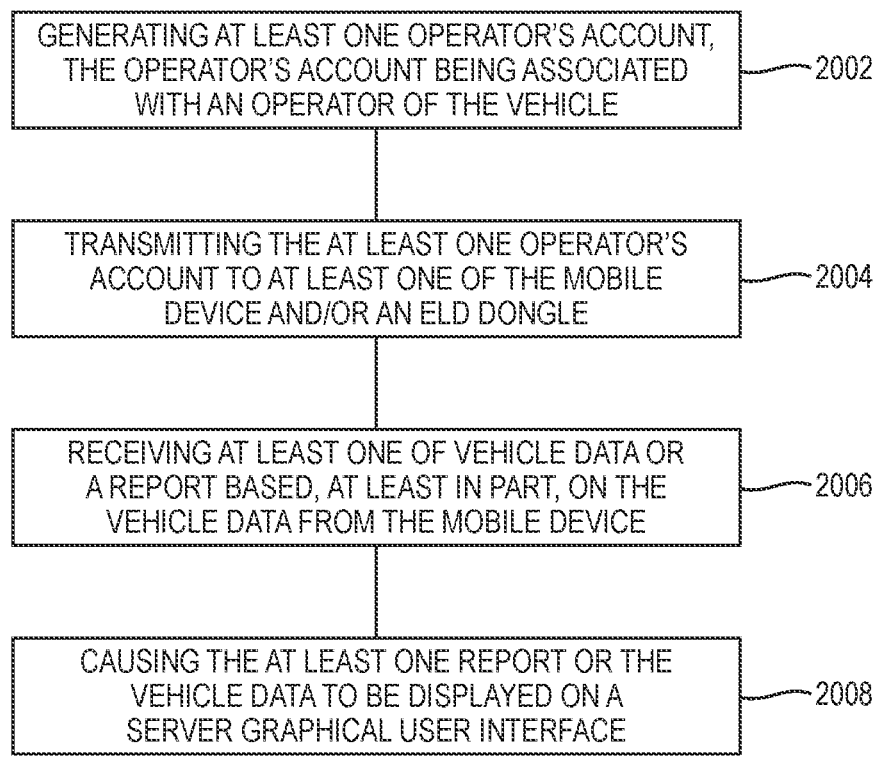
FIG. 20 is an example of operations that may be carried out by the remote server of FIG. 15, consistent with embodiments of the present disclosure.

FIG. 20 shows one example of instructions that may be stored in, for example, the memory 1504 of the remote server 106. For example, the memory 1504 may include one or more instructions causing the remote server 106 to carry out an operation 2002. The operation 2002 may include generating at least one operator's account, the operator's account being associated with an operator of the vehicle 114. Additionally, or alternatively, the memory 1504 may include one or more instructions causing the remote server 106 to carry out an operation 2004. The operation 2004 may include transmitting the at least one operator's account to at least one of the mobile device 102 and/or an ELD dongle 104. Additionally, or alternatively, the memory 1504 may include one or more instructions causing the remote server 106 to carry out an operation 2006. The operation 2006 may include receiving at least one of vehicle data or a report based, at least in part, on the vehicle data from the mobile device 102 communicatively coupled to the ELD dongle 104, the ELD dongle 104 being communicatively coupled to the vehicle 114, wherein the received vehicle data or the received report is associated with the at least one operator's account. Additionally, or alternatively, the memory 1504 may include one or more instructions causing the remote server 106 to carry out an operation 2008. The operation 2008 may include causing the at least one report or the vehicle data to be displayed on a server graphical user interface (GUI). The memory 1504 may include any one or more of the above instructions and/or may include additional instructions, consistent with the present disclosure. Further, the remote server 106 may carry out the operations in any suitable order.

According to one aspect of the present disclosure there is provided a mobile device for use in an electronic logging device (ELD) system. The mobile device may include a processor and one or more memories which store, singularly or in combination, one or more instructions, which when executed by the processor cause the mobile device to carry out one or more operations. The one or more operations may include reading a machine readable code configured to be coupled to a vehicle, connecting to an ELD dongle based, at least in part, on the machine readable code, receiving data from the ELD dongle, and generating one or more mobile device reports based, at least in part, on the received data.

According to another aspect of the present disclosure there is provided an electronic logging device (ELD) dongle for use in an ELD system. The ELD dongle may include a processor and one or more memories. The one or more memories may store, singularly or in combination, one or more instructions, which when executed by the processor cause the ELD dongle to carry out one or more operations. The one or more operations may include receiving vehicle data using a diagnostics communication interface, the diagnostics communication interface being communicatively coupled to a diagnostics port of a vehicle, encrypting the received vehicle data from the vehicle using a secure chip, and transmitting the encrypted vehicle data to a mobile device.

According to yet another aspect of the present disclosure there is provided an electronic logging device (ELD) dongle for use in an ELD system. The ELD dongle may include an ELD dongle base and an ELD head detachably coupled to the ELD dongle base. The ELD head may include a mobile device communication interface configured to communicatively couple to a mobile device. The ELD dongle may also include a diagnostics communication interface. The diagnostics communication interface may be configured to communicatively couple the ELD head with a diagnostics port of a vehicle.

According to still another aspect of the present disclosure there is provided a mobile device for use in an electronic logging device (ELD) system. The mobile device may include a processor and one or more memories which store, singularly or in combination, one or more instructions, which when executed by the processor cause the mobile device to carry out one or more operations. The one or more operations may include connecting to an ELD dongle, receiving data from the ELD dongle, transmitting the received data to a remote server for generation of one or more remote server reports, and generating one or more mobile device reports based, at least in part, on the received data.

According to yet another aspect of the present disclosure there is provided an electronic logging device (ELD) system. The ELD system may include an ELD dongle configured to be communicatively coupled to a vehicle and a mobile device configured to be communicatively coupled to the ELD dongle. The mobile device may communicatively couple to the ELD dongle in response to the mobile device reading a machine readable code. The ELD system may also include a remote server configured to be communicatively coupled to the mobile device.

The present disclosure describes the generation of various reports. It should be appreciated that, in view of the present disclosure, each of the described reports can be generated by the mobile device 102, the ELD dongle 104, and/or remote server 106.

The one or more GUIs and/or applications discussed herein may be implemented, for example, using any combination of hardwired circuitry, programmable circuitry, state machine circuitry, and/or firmware that stores instructions executed by programmable circuitry. In some instances, the GUIs and/or applications may be stored on a storage medium. The storage medium may include any type of tangible, non-transitory storage medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage media suitable for storing electronic instructions.

The one or more memory devices described herein (e.g., memory 210, memory 1304, and/or memory 1504) may be any combination of one or more of the following types of memory: semiconductor firmware memory, programmable memory, non-volatile memory, read only memory, electrically programmable memory, random access memory, flash memory, magnetic disk memory, and/or optical disk memory.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The indefinite articles "a" and "an," as used herein in the specification and in the claims, unless clearly indicated to the contrary, should be understood to mean "at least one."

The terms "couple" and "coupled," as used herein, encompass both direct and indirect coupling unless clearly indicated to the contrary.

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

What is claimed is:

1. An electronic logging device (ELD) dongle comprising:
    an ELD dongle base having a first base end and a second base end, the first base end including a diagnostics communication interface configured to detachably couple to a diagnostics port of a vehicle and the second base end including a dongle base connector that is electrically coupled to the diagnostics communication interface;
    an ELD head, the ELD head including a mobile device communication interface configured to communicatively couple to a mobile device, an electrical head connector, a first mechanical head connector, and a second mechanical head connector, the first and second mechanical head connectors being on opposing sides of the electrical head connector;
    a cable communicatively coupling the ELD dongle base to the ELD head, the cable includes a first cable end having a cable connector configured to detachably couple to the dongle base connector and a second cable end having a cover configured to engage each of the first and second mechanical head connectors to detachably couple the cover to the ELD head; and
    an attachment mechanism coupled to the cover, the attachment mechanism being configured to couple the cover to the vehicle.

2. The ELD dongle of claim 1, further comprising a secure chip, the secure chip encrypting data received from the vehicle.

3. The ELD dongle of claim 1, wherein the mobile device communication interface communicatively couples to the mobile device using Bluetooth.

4. The ELD dongle of claim 1, wherein the mobile device communication interface communicatively couples to the mobile device in response to the mobile device reading a machine readable code configured to be coupled to a vehicle.

5. The ELD dongle of claim 4, wherein the machine readable code is a matrix barcode.

6. An electronic logging device (ELD) system comprising:
   an ELD dongle configured to be communicatively coupled to a vehicle, the ELD dongle including:
      an ELD head having an electrical head connector, a first mechanical head connector, and a second mechanical head connector, the first and second mechanical head connectors being on opposing sides of the electrical head connector;
      an interchangeable ELD dongle base, wherein the interchangeable ELD dongle base is configured to detachably couple to a diagnostics port of a vehicle and includes a dongle base connector;
      a cable communicatively coupling the interchangeable ELD dongle base to the ELD head, the cable includes a first cable end having a cable connector configured to detachably couple to the dongle base connector and a second cable end having a cover configured to engage each of the first and second mechanical head connectors to detachably couple the cover to the ELD head; and
      an attachment mechanism coupled to the cover, the attachment mechanism being configured to couple the cover to the vehicle;
   a mobile device configured to be communicatively coupled to the ELD dongle, wherein the mobile device communicatively couples to the ELD dongle in response to the mobile device reading a machine readable code; and
   a remote server configured to be communicatively coupled to the mobile device.

7. The ELD system of claim 6, wherein the machine readable code is a matrix barcode.

8. The ELD system of claim 6, wherein the mobile device receives data from the ELD dongle.

9. The ELD system of claim 8, wherein the mobile device transmits the data received from the ELD dongle to the remote server.

10. The ELD system of claim 9, wherein the mobile device generates one or more mobile device reports based, at least in part, on the data received from the ELD dongle and the remote server generates one or more remote server reports based, at least in part, on the data transmitted by the mobile device.

11. The ELD system of claim 6, wherein the ELD dongle includes a secure chip for encrypting data transmitted to the mobile device.

* * * * *